(12) United States Patent
Lorey

(10) Patent No.: US 11,447,048 B2
(45) Date of Patent: Sep. 20, 2022

(54) SYSTEM FOR AUTOMATIC TILT COMPENSATION WITHIN A VEHICLE

(71) Applicant: GRAMMER AG, Amberg (DE)

(72) Inventor: Konstantin Lorey, Amberg (DE)

(73) Assignee: GRAMMER AG, Ursensollen (DE)

( * ) Notice: Subject to any disclaimer, the term of this patent is extended or adjusted under 35 U.S.C. 154(b) by 254 days.

(21) Appl. No.: 16/860,735

(22) Filed: Apr. 28, 2020

(65) Prior Publication Data

US 2020/0346563 A1    Nov. 5, 2020

(30) Foreign Application Priority Data

Apr. 30, 2019 (DE) .......................... 102019111188.9

(51) Int. Cl.
| | | |
|---|---|---|
| *B60N 2/39* | (2006.01) | |
| *B60N 2/02* | (2006.01) | |
| *B60N 2/10* | (2006.01) | |

(52) U.S. Cl.
CPC ............. *B60N 2/39* (2013.01); *B60N 2/0244* (2013.01); *B60N 2/10* (2013.01)

(58) Field of Classification Search
CPC .......... B60N 2/02; B60N 2/0244; B60N 2/04; B60N 2/10; B60N 2/39; B60N 2/501; B60N 2/502
USPC ............................................. 296/65.18, 68.1
See application file for complete search history.

(56) References Cited

U.S. PATENT DOCUMENTS

| | | | | |
|---|---|---|---|---|
| 2,984,290 A | * | 5/1961 | Miller ...................... | B60N 2/39 248/608 |
| 3,021,107 A | * | 2/1962 | Salo ......................... | B60N 2/39 246/16 |
| 3,713,617 A | * | 1/1973 | Bogdan ................... | B60N 2/525 248/371 |
| 5,857,535 A | | 1/1999 | Brooks | |
| 2012/0025577 A1 | | 2/2012 | Kolb | |
| 2012/0043798 A1 | | 2/2012 | Haller et al. | |
| 2012/0161485 A1 | * | 6/2012 | Stockwell ................ | B60N 2/39 297/344.11 |
| 2017/0120787 A1 | * | 5/2017 | Lorey ...................... | B60N 2/502 |

(Continued)

FOREIGN PATENT DOCUMENTS

| | | |
|---|---|---|
| CH | 693590 | 10/2003 |
| CN | 101622153 | 1/2010 |
| CN | 205168252 | 4/2016 |
| CN | 109606216 | 4/2019 |
| DE | 3715128 | 11/1988 |

(Continued)

OTHER PUBLICATIONS

Extended Search Report for European Patent Application No. 20168220.0, dated Oct. 2, 2020, 3 pages.

(Continued)

*Primary Examiner* — Jason S Daniels

(74) *Attorney, Agent, or Firm* — Sheridan Ross P.C.

(57) ABSTRACT

The invention relates to a system for automatic tilt compensation within a vehicle, comprising a first assembly and a second assembly which is pivotally connected to the first assembly by means of a first axis, wherein the system further comprises a pendulum arrangement which is pivotally connected to the second assembly by means of a second axis arranged above the first axis and at an upper end of the pendulum arrangement, wherein a deflection of the pendulum arrangement relative to the second assembly can be detected.

20 Claims, 19 Drawing Sheets

(56) References Cited

U.S. PATENT DOCUMENTS

2017/0203673 A1* 7/2017 Parker .................. A01D 34/86
2018/0105082 A1   4/2018 Knox

FOREIGN PATENT DOCUMENTS

| DE | 4115639 | 11/1992 |
| DE | 19501087 | 7/1996 |
| DE | 102018210716 A1 * | 10/2019 |
| EP | 0098194 | 1/1984 |
| WO | WO 97/28981 | 8/1997 |

OTHER PUBLICATIONS

Official Action for German Patent Application No. 102019111188.9, dated Feb. 12, 2020, 2 pages.
Official Action with English Translation for China Patent Application No. 202010356252.3, dated Mar. 8, 2022, 18 pages.

* cited by examiner

SYSTEM FOR AUTOMATIC TILT COMPENSATION WITHIN A VEHICLE

CROSS-REFERENCE TO RELATED APPLICATIONS

This application claims the benefit of German Patent Application No. 10 2019 111 188.9 filed Apr. 30, 2019, the entire disclosure of which is incorporated herein by reference in its entirety.

FIELD

The invention relates to a system for automatic tilt compensation within a vehicle.

BACKGROUND

In the context of the present invention, tilt compensation is particularly relevant, which is necessary due to rotational movements which vehicles, for example commercial vehicles such as tractors, perform about their main axes when travelling over uneven ground. These rotational movements are also referred to as rolling (rotation about the longitudinal axis) and pitching (rotation about the transverse axis). For example, the vehicle drives its left front wheel over a bump like a large stone. The vehicle then experiences both a rotational movement about the longitudinal axis and a rotational movement about the transverse axis. If the vehicle is travelling on a slope and parallel thereto, for example, it only experiences a rotational movement about the longitudinal axis. The entire vehicle is thus deflected about the longitudinal axis for the duration of travel on the slope. A vehicle seat that is rigidly connected to the chassis, for example, is correspondingly also deflected about the longitudinal axis. It will be appreciated that, from a certain degree and/or a certain duration, this tilt is uncomfortable for the driver.

It is therefore expedient to develop a system that allows the deflection (for example, of the vehicle seat) to be automatically restored to an initial position. However, only systems which provide for the arrangement of a plurality of sensors that detect the deflection are known from the prior art. The signals from the sensors then activate an actuator system, which causes the relevant elements to be restored to the initial position.

An assembly that has a centre of gravity that is higher than an axis of rotation about which the assembly can perform a rotational movement is known to be unstable. Returning the assembly to the initial position, which in the present case means elimination of the deflection, and thus a tilt compensation, can only function with a restoring force.

SUMMARY

The object of the present invention is therefore to develop a system for automatically restoring the deflection, which system activates the actuator system purely mechanically.

This object is achieved according to the features of claim 1.

Accordingly, a system for automatic tilt compensation within a vehicle is proposed, comprising a first assembly and a second assembly which is pivotally connected to the first assembly by means of a first axis, wherein the system further comprises a pendulum arrangement which is pivotally connected to the second assembly by means of a second axis arranged above the first axis and at an upper end of the pendulum arrangement, wherein a deflection of the pendulum arrangement relative to the second assembly can be detected.

The system functions with respect to a deflection about the X axis, which represents, for example, a longitudinal axis of the vehicle, and thus provides roll compensation. Furthermore, the system also functions with respect to a deflection about the Y axis, which represents, for example, a transverse axis of the vehicle, and thus provides pitch compensation.

It should be mentioned that the system can relate to a chassis of the vehicle as the first assembly and to the deflection of a vehicle seat as the second assembly (as will be described in more detail below), but the system is not limited to this. For example, an ambulance having a chassis (first assembly) and having a stretcher or a transport device for casualties (second assembly) could also be provided with such a system for automatic tilt compensation in order to be able to transport a casualty without tilting.

The arrangement described ensures that pivoting of the first assembly and/or of the second assembly can be detected by means of arrangement of the pendulum arrangement. According to the system, a deflection of the first assembly leads to a deflection of the second assembly and initially, for example, not to or also to a deflection of the pendulum arrangement. However, the suspension of the pendulum arrangement at the upper end ensures that this pendulum arrangement can swing freely about the second axis, so that the lower end of the pendulum arrangement moves with gravity and returns relatively quickly to an initial position, which it occupied, for example, before the deflection. This provides a simple way of detecting the deflection of the second assembly, the instantaneous position of which deviates, for example, from the initial position of the second assembly, relative to the pendulum arrangement.

Since the first assembly, the second assembly and the pendulum arrangement can each be deflected relative to one another, a distinction is made for the purposes of the present invention between a first initial position of the first assembly, a second initial position of the second assembly and a third initial position of the pendulum arrangement. The initial positions exist when the coordinate system of the first assembly, the second assembly and/or the pendulum arrangement is in each case arranged identically to the global coordinate system. The global coordinate system is a Cartesian coordinate system with the mutually perpendicular axes X (global longitudinal direction), Y (global width direction) and Z (global height direction), wherein the global height direction is arranged parallel to the vector of gravity in the context of the invention.

According to a preferred embodiment, it is advantageous if the first axis and the second axis lie on a common straight line which is arranged extending in a height direction of the vehicle. The height direction of the vehicle preferably corresponds to the global height direction at least when the vehicle is not deflected. In the context of the present invention, the global height direction is arranged parallel to the vector of gravity. However, it should be mentioned that the system also functions when the first axis and the second axis do not lie on this common straight line, but instead are offset in the horizontal direction, for example.

The first assembly preferably comprises a supporting bar element, the longitudinal extension of which is arranged parallel to the global width direction in the first initial position. The first assembly preferably comprises a bearing element for the first axis, which is rigidly connected to the supporting bar element, preferably to the upper side thereof.

The supporting bar element and the bearing element preferably form an assembly which has one, preferably exactly one, axis of mirror symmetry. For example, the abovementioned common straight line forms this axis of mirror symmetry.

It can be advantageous if the system is not sensitive to relatively small deflections and is therefore designed to ignore them. It is therefore conceivable that the pendulum arrangement comprises a pendulum element which can be deflected about the second axis by means of a pivot bearing which provides damping. A damping ratio of the provided damping can be freely selected in a certain range by suitable selection of the pivot bearing. The degree of deflection of the pendulum arrangement, which can also be referred to as the amplitude, is in the present case positively correlated to the duration of the deflection. For example, it is provided that only deflections which last longer than one second can be detected by means of the system according to the invention.

To ensure that the pendulum element can swing back into the third initial position as quickly and/or reliably as possible after it has been deflected by the deflection of the first and second assemblies, it is advantageous if a correspondingly high torque is provided to initiate this movement. It is therefore advantageous, for example, if a distance between a centre of mass of the pendulum element and a lower end of the pendulum arrangement is smaller than a distance between the centre of mass of the pendulum element and the upper end of the pendulum arrangement. If it is assumed in a simplified manner that the entire mass of the pendulum arrangement is concentrated in the centre of mass of the pendulum element, the further the centre of mass is from the second axis and/or from the upper end of the pendulum arrangement, the greater the lever arm that results with respect to a rotation of the pendulum arrangement about the second axis. The greater the lever arm, the greater the resulting torque, of course. The greater the torque, the faster the deflection of the pendulum arrangement in relation to the second assembly, the detection of this deflection and the return of the second assembly to the second initial position.

For example, the pendulum element is configured in a T-shape and/or in the shape of a hammer, which is arranged upside down at least in the third initial position. Alternatively, the pendulum element can have a substantially rectilinear shape between the first end and the second end, wherein it is also advantageous here if the centre of mass of the pendulum element is arranged as described above.

In order to detect the deflection of the second assembly in relation to the pendulum arrangement, it would be possible, for example, to attach an angle sensor. However, it is provided in particular that the system according to the invention does not require any sensors, actuators and/or control for detection of the deflection. It is particularly advantageous if only a single degree of deflection in a first direction and/or a single degree of deflection in a second direction can be detected by means of the system. In contrast to a system which can determine several or all degrees of deflection, this configuration allows the system to be constructed simply and cost-effectively.

In addition, this single degree of deflection can be regarded as a limit up to which a deflection is still tolerated. Countermeasures must only be taken when the limit is reached. At the same time, a qualitative statement can be made as to whether the limit has already been reached or not; hence whether the deflection is still greater than or equal to zero and at the same time lower than the limit, or whether the deflection has already reached the limit.

It is therefore conceivable, for example, that the second assembly comprises at least one first contact element for closing a circuit. It is also advantageous if the pendulum arrangement has at least one second contact element for closing the circuit at a lower end. The at least one first and the at least one second contact element are preferably spaced apart from one another in the second and third initial positions and can be arranged in contact with one another by means of the deflection of the pendulum arrangement relative to the second assembly. The circuit is therefore at least not closed when the second and third initial positions are present together or when the second assembly and the pendulum arrangement are identically deflected.

For the purposes of the present invention, the first and the second contact elements for closing a circuit in the contacting state form, for example, a closed circuit, i.e. both are traversed by the charge carriers of the circuit. Alternatively, it can be provided that the first contact element contacts the second contact element, wherein the first contact element is configured as a purely mechanical contact element and/or the second contact element is designed as an electrical switch, contactless switch, Hall effect sensor, magnetic switch, reed switch, etc. In this case, "contacting" is to be understood in such a way that the first and the second contact elements approach one other as far as is necessary to close the circuit.

It is preferred that at least two first contact elements and/or at least two second contact elements are arranged for closing the circuit. Most preferably, exactly two first contact elements and/or exactly two second contact elements are arranged for closing the circuit. The number of first contact elements is preferably identical to the number of second contact elements.

If the circuit is closed and the current flows accordingly, this current flow can be detected directly. Indirectly, it can be detected that the second assembly has reached the limit of deflection via the detection of the current flow.

So that a closed circuit can be formed, power line elements such as power cables can be arranged within the system, which power line elements are arranged starting from the first contact element via the pendulum arrangement to the second contact element. Alternatively, it can be provided that the charge carriers of the circuit are transported at least in part through electrically conductive portions of the system which are not formed by cables; for example, it would be conceivable that starting from the contact elements, conductive portions are formed by power cables, by one or more portions of the pendulum element and/or by one or more portions of the second assembly.

It has been found to be advantageous if the second assembly has a rocker element which is rotatably mounted about the first axis and on the upper side of which the at least one first contact element is arranged. This rocker element offers a solid basis for further elements of the second assembly and, at the same time, a simple way of arranging the at least one first contact element.

It is also advantageous if the second assembly has a first bar element, which is arranged perpendicular to the rocker element and is rigidly connected thereto, wherein the pivot bearing for the pendulum element is arranged at an upper end of the first bar element. The bar element and the rocker element preferably together form a T shape, which is arranged upside down in relation to the height direction of the second assembly.

At least one of the elements of the second assembly is preferably arranged mirror-symmetrically to the common straight line and/or to a further straight line. In the first and second initial positions, the rocker element and/or the bar element are preferably each configured to be mirror-symmetrical to the common straight line and/or to the further straight line.

In the first and second initial positions, the rocker element and/or the bar element are preferably each configured to be mirror-symmetrical to the common straight line and/or to the further straight line. If exactly two first contact elements are arranged, these are preferably arranged mirror-symmetrically to one another in the first and second initial positions with respect to the common straight line and/or to the further straight line. If exactly two second contact elements are arranged, these are preferably arranged mirror-symmetrically to one another in the first and second initial positions with respect to the common straight line and/or to the further straight line.

The pendulum element and/or the pendulum assembly is preferably configured to be mirror-symmetrical. At least in the third initial position, the axis of mirror symmetry is preferably the common straight line and/or the further straight line.

Closing the circuit can thus advantageously serve as indirect detection of the deflection of the pendulum element. At the same time, it is preferred that at least one consumer element is arranged within the circuit.

It is convenient if an event occurs at the same time as the detection of the deflection, which immediately allows further measures to be taken to eliminate the deflection. It is therefore preferred that the consumer element is configured as an actuator system, by means of which the deflection of the pendulum arrangement can be returned relative to the second assembly.

Different variants of the actuator system are described below. All or several of these variants preferably comprise a device to provide a resilient suspension of the vehicle seat. This device is, for example, a rotary suspension damping system which allows or cushions and/or dampens rotation about the first axis. However, it can also be the case that the system only works statically and/or is not provided with such a device.

The actuator system preferably comprises a pump, for example an air pump, which works in combination with a pneumatic system. It may also be the case that the actuator system has a mechanical system which provides a motor and a transmission. A combination of a mechanical and a pneumatic system is also possible.

The terms "air spring" and "air muscle" are used below. An air muscle describes an element which has devices such as bores at its two ends, by means of which it can be connected to other elements particularly securely and, for example, by means of a rotary joint. An air spring, on the other hand, is connected to other elements, for example, along a mere contact formation, for example along a contact surface.

For example, the actuator system comprises at least one pneumatic element configured as an air muscle or as an air spring having a first end and a second end and an air reservoir arranged between the first and the second end, wherein the quantity of air in the air reservoir of the pneumatic element can be changed.

If the pneumatic element is configured as an air muscle, it is preferred that the first end of the air muscle is arranged above the second end of the air muscle and is rotatably connected to the first assembly, and that the second end of the air muscle is rotatably connected to the second assembly.

If the pneumatic element is configured as an air spring, it is preferred that the first end of the air spring is arranged above the second end of the air spring and is rotatably connected to the second assembly, and the second end of the air spring is rotatably connected to the first assembly.

The distance between the first and the second end of the pneumatic element can be changed by varying the quantity of air in the air reservoir. This also changes the deflection of the second assembly relative to the first assembly.

According to a first preferred variant, the second end of the at least one pneumatic element configured as an air muscle is arranged between the rocker element and the first assembly or at the same height as the rocker element. However, the first end of the air muscle is located above the rocker element. The air muscle is preferably arranged above the rocker element. The air muscle is preferably arranged above, most preferably completely above, the supporting bar element. According to the first preferred variant, the first assembly comprises a frame element, which is preferably rigidly connected to the supporting bar element and/or is arranged above it. The first end of the air muscle is preferably rotatably connected to the frame element. According to the first preferred variant, the first end of the air muscle is preferably in contact with the first assembly and the second end of the air muscle is in contact with the second assembly.

According to a second preferred variant, the at least one pneumatic element is configured as an air spring, which is arranged directly between the rocker element and the first assembly. The air spring is preferably arranged below, most preferably completely below, the rocker element. The air spring is preferably arranged above, most preferably completely above, the supporting bar element. According to the second variant, the first and the second end of the air spring are therefore preferably arranged between the rocker element and the first assembly. In addition, the first end of the air spring is in contact with the second assembly and the second end of the air spring is in contact with the first assembly.

It is preferred that the actuator system for returning the second assembly according to the first variant comprises exactly one first and exactly one second air muscle and is otherwise free of further air muscles and air springs. It is also preferred that the actuator system for returning the second assembly according to the second variant comprises exactly one first and exactly one second air spring and is otherwise free of further air muscles or air springs. These air muscles or air springs are preferably arranged next to one another in the first and second initial position in a global width direction and/or extend parallel to the global height direction with regard to their expansion between the first and the second ends. A first air quantity in the first air muscle or in the first air spring can preferably be controlled independently of a second air quantity in the second air muscle or in the second air spring; the same preferably applies vice versa. The second assembly can thus be returned to the second initial position much faster and more evenly with two air muscles or with two air springs.

Alternatively or cumulatively, it can be provided that the actuator system comprises at least one first electric drive, by means of which the second assembly can be actively rotated about the first axis. This electric drive and/or its transmission elements are preferably connected directly to the first axis. The electric drive is preferably arranged in contact with the supporting bar element of the first assembly. The supporting bar element of the first assembly preferably represents a bearing device for the electric drive. This is a third preferred variant of the actuator system. As the only one of the variants described, this third variant preferably does not comprise a suspension/damping device which resiliently supports the entire system; instead, the angle compensation is purely static.

Furthermore, it can be provided that the actuator system according to a fourth preferred variant comprises at least one second electric drive, by means of which the second axis can be actively rotated, wherein a second bar element, which is connected at its centre to the second axis, is connected to the rocker element by means of at least two spring elements. This second electric drive and/or its transmission elements are preferably connected directly to the second axis. The second assembly is thus cushioned by means of the arrangement described and/or is returned to the second initial position. For example, the second bar element is pivotally mounted directly about the second axis or is rigidly connected thereto. Furthermore, it is possible for the second bar element to be pivotally arranged about a fourth axis, which preferably also lies on the common straight line. For example, the fourth axis is arranged on the second bar element; thus the second bar element is indirectly connected to the second axis.

In practice, it has proven to be advantageous if the first assembly comprises a wheel system of the vehicle and the second assembly comprises a vehicle seat of the vehicle.

In one or more or all of the embodiments of the system according to the invention described above, it is advantageous if at least one first damper unit is arranged, which is connected by means of a first end to the second assembly, in particular to a third bar element, and likewise by means of a second end to the second assembly, in particular to the rocker element. The third bar element is preferably pivotally arranged about a third axis arranged on the first bar element. The third axis preferably lies on the common straight line of the first and second axes and is connected, for example, to the first bar element.

This first damper unit ensures energy dissipation in the vibrating system and therefore a gentle restoration of the second assembly to the initial position. Exactly two first damper units are preferably arranged, which can in particular be arranged symmetrically to one another with reference to the common straight line of the first and second axes and/or to the further straight line.

For example, the pendulum arrangement comprises the abovementioned pivot bearing having a damping function. Furthermore, the pendulum arrangement can comprise a brake, for example a silicone brake, which is preferably arranged at the upper end of the pendulum arrangement. Furthermore, at least one second damper unit can be arranged, which dampens the movement of the pendulum element and in particular its movement back into the initial position.

For example, this second damper unit is arranged perpendicular to the common straight line of the first and second axes and/or perpendicular to the longitudinal direction/longitudinal axis of the pendulum element in its initial position. Exactly two second damper units are preferably arranged, which are arranged opposite one other in mirror image in relation to the common straight line and/or to the longitudinal direction/longitudinal axis of the pendulum element in its initial position.

For example, the at least one second damper unit can be in a first state, in which damping work can be performed, and in a second state, in which no damping work can be performed; this preferably applies at least to one direction of movement. For example, in the case of a classic single-tube damper, the second state corresponds to the state in which the piston has been completely retracted into the cylinder. In the first state, the at least one second damper unit is preferably arranged each with one end in contact with the lower end of the pendulum arrangement.

According to a particularly preferred embodiment of the pendulum arrangement, said arrangement is configured with the silicone brake and/or two second damper units.

BRIEF DESCRIPTION OF THE DRAWINGS

Further advantages, aims and properties of the present invention are illustrated by way of the accompanying drawings and the following description, which show and describe embodiments of the system by way of example. In the drawings:

FIG. 3b shows an enlarged view of FIG. 3a;

FIG. 4b shows an enlarged view of FIG. 4a;

FIG. 5b shows an enlarged view of FIG. 5a;

DETAILED DESCRIPTION

The present drawings each describe a system S, according to which the first assembly 10 comprises a wheel system 100 of the vehicle V and the second assembly 20 comprises a vehicle seat 200 of the vehicle V.

Figure 1:
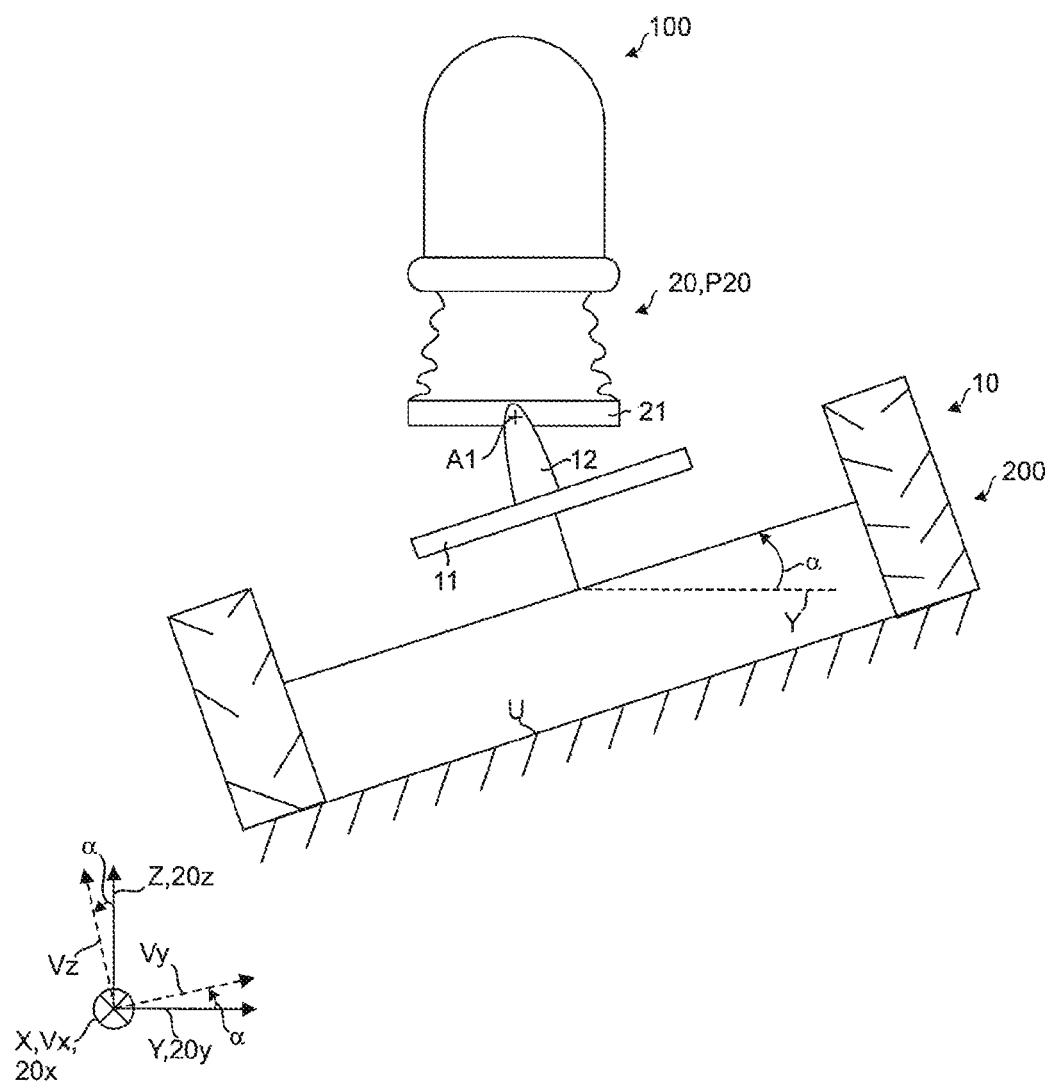
FIG. 1 shows an example of a system according to the invention in a deflected state.

According to FIG. 1, a highly simplified schematic diagram of the system S according to the invention for automatic tilt compensation within a vehicle V is shown first of all. A Cartesian coordinate system with the global axes X, Y and Z is illustrated, where Z is arranged parallel to the direction of gravity. The axes X and Y span a horizontal plane and are arranged perpendicular to the gravity vector (axis Z). It will be appreciated that the exact orientation of the two axes X and Y can be freely selected within the framework of the boundary conditions described.

In the present case, the axis X perpendicular to Z and Y is arranged parallel to the longitudinal direction Vx of the vehicle V. In the context of the present invention, the height direction Vz of the vehicle V (in addition to the second assembly 20 and the pendulum arrangement 30) also means the height direction of the first assembly 10; the same applies analogously to the width direction Vy and the longitudinal direction Vx of the vehicle V with respect to the width direction and the longitudinal direction of the first assembly 10. Since the system S in itself and in particular the first assembly 10 can be pivoted against the second assembly 20, it is expedient to select different coordinate systems for the first assembly 10 and the second assembly 20.

The ground surface U and thus also the first assembly 10 of the vehicle V have a tilt a with respect to the global width direction Y. For example, the vehicle V runs parallel to a slope and thus performs a rotational movement about the longitudinal axis Vx (roll movement). The first assembly 10 is thus deflected about the axis X by the angle α relative to its initial position P10 (see FIG. 2a).

A second assembly 20 is pivotally connected to the first assembly 10 about an axis A1. This second assembly 20 is already shown here in its state returned to the second initial position P20; the tilt compensation has thus already taken place, so that in particular the rocker element 21 of the second assembly 20 shown has already been orientated horizontally again, i.e. within a plane spanned by the X and Y axes of the global coordinate system. The longitudinal extension of the rocker element 21 is arranged parallel to the global width direction Y in the present case.

It applies overall that, according to FIG. 1, the longitudinal direction 20x of the second assembly 20 is arranged parallel to the global longitudinal direction X. Furthermore, the width direction 20y of the second assembly 20 is arranged parallel to the global width direction Y. In addition, the height direction 20z of the second assembly 20 is arranged parallel to the global height direction Z. The second assembly 20 is thus in its initial position P20.

The following drawings describe further details and embodiments of the system S according to the invention for automatic tilt compensation within a vehicle V, comprising the first assembly 10 and the second assembly 20 which is pivotally connected to the first assembly 10 by means of a first axis A1, wherein the system S further comprises a pendulum arrangement 30 which is pivotally connected to the second assembly 20 by means of a second axis A2 arranged above the first axis A1 and at an upper end 31 of the pendulum arrangement 30, wherein a deflection of the pendulum arrangement 30 relative to the second assembly 20 can be detected.

A chronological sequence of events is illustrated in FIGS. 2a to 2d, such as can occur when travelling parallel to a slope.

Figure 2A:
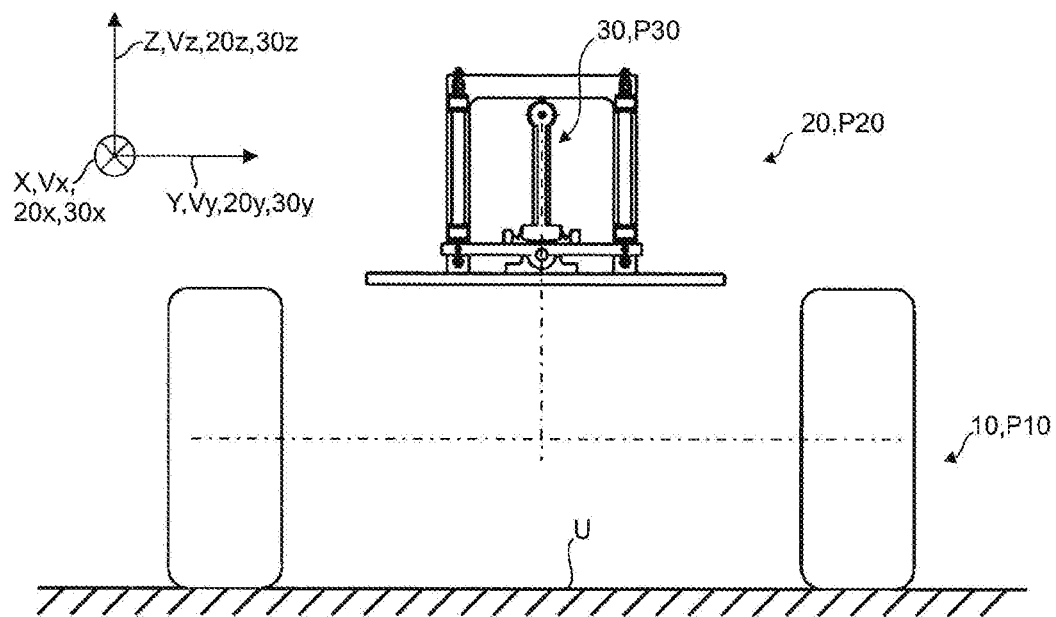
FIG. 2a is a schematic view of a system according to the invention according to a first preferred variant in an initial position.

According to FIG. 2a, the vehicle V is first arranged on a ground surface U which is arranged parallel to the global width direction Y. Accordingly, the coordinate systems of the vehicle V, the first assembly 10, the second assembly 20 and the pendulum arrangement 30 are all arranged in accordance with the global coordinate system. The first assembly 10, the second assembly 20 and the pendulum arrangement 30 are therefore each in the initial position P10, P20, P30.

Figure 2B:
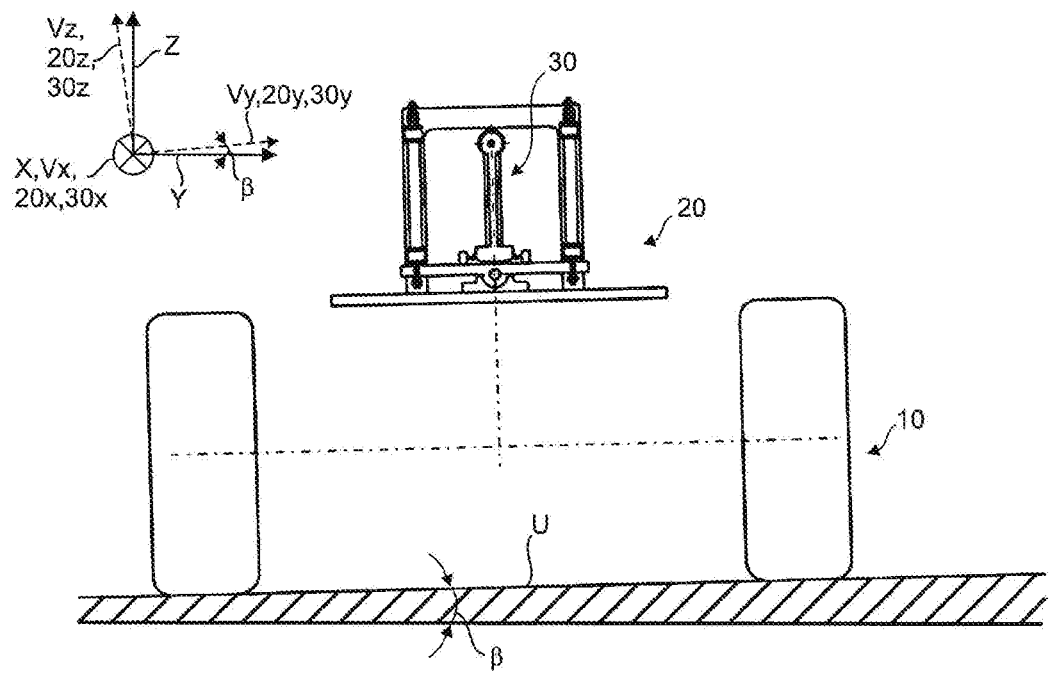
FIG. 2b is a schematic view of the system according to the invention according to FIG. 2a in a position in which the first assembly is deflected.
Figure 2C:
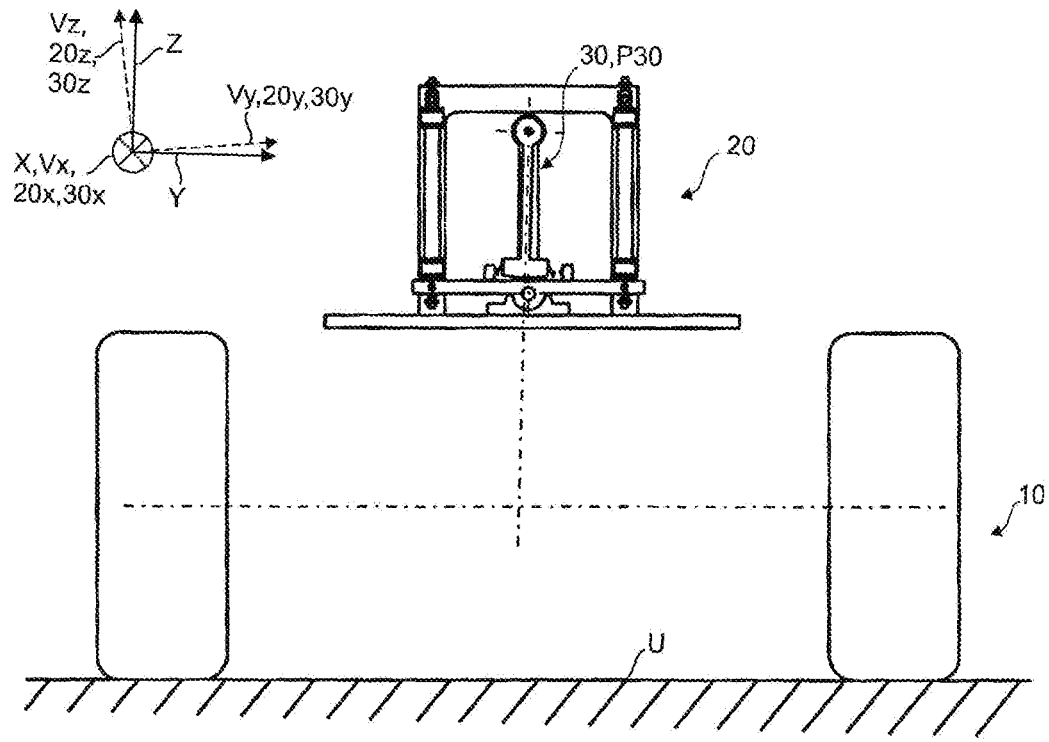
FIG. 2c is a schematic view of the system according to the invention according to FIG. 2a in a position in which the actuator system is activated.
Figure 2D:
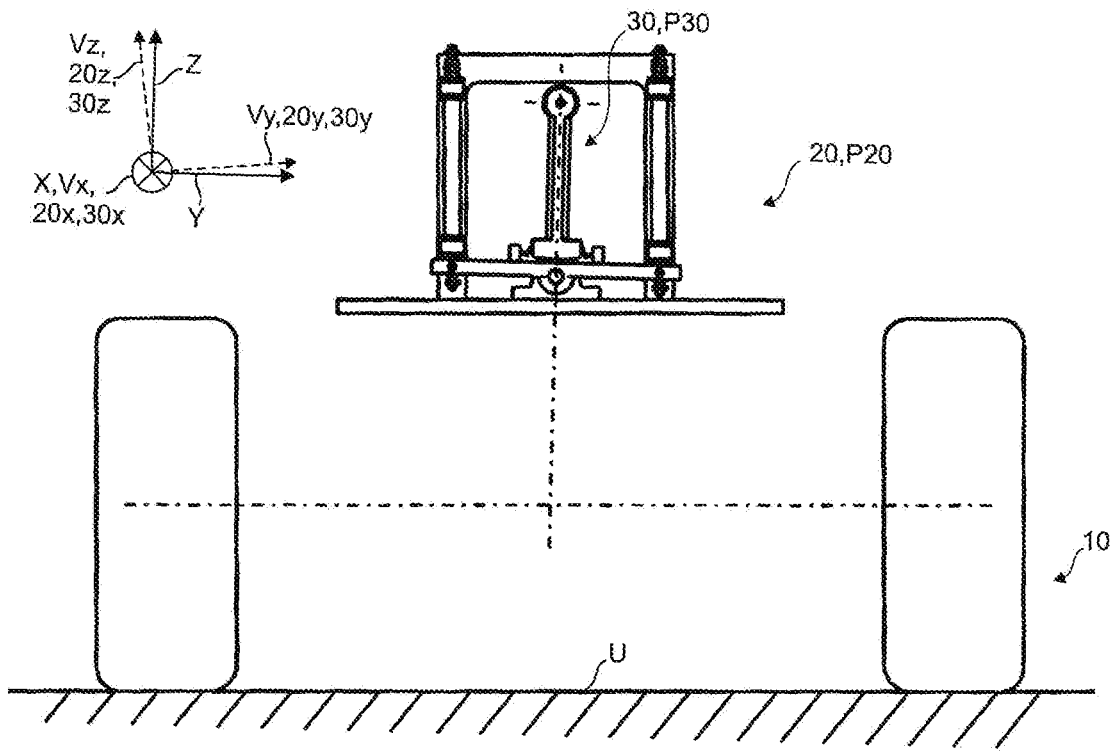
FIG. 2d is a schematic view of the system according to the invention according to FIG. 2a in a position in which the actuator system has already returned the second assembly to its initial position.

According to FIGS. 2b to 2d, the vehicle V is arranged on a ground surface U, which is arranged at an angle β to the global width direction Y.

Consequently, according to FIG. 2b, the coordinate systems of the vehicle V, the first assembly 10, the second assembly 20 and the pendulum arrangement 30 are all offset at least in relation to their height direction Vz, 20z, 30z and their width direction Vy, 20y, 30y by the angle β from the global coordinate system.

It can be assumed that the degree of damping of the pivot bearing 34 of the second axis A2 is so high that the pendulum arrangement 30 only reacts to its deflection with a delay. Therefore, as described above according to FIG. 2b, it can be seen that the pendulum arrangement 30 likewise experiences a deflection about the longitudinal axis 30x.

Figure 2E:
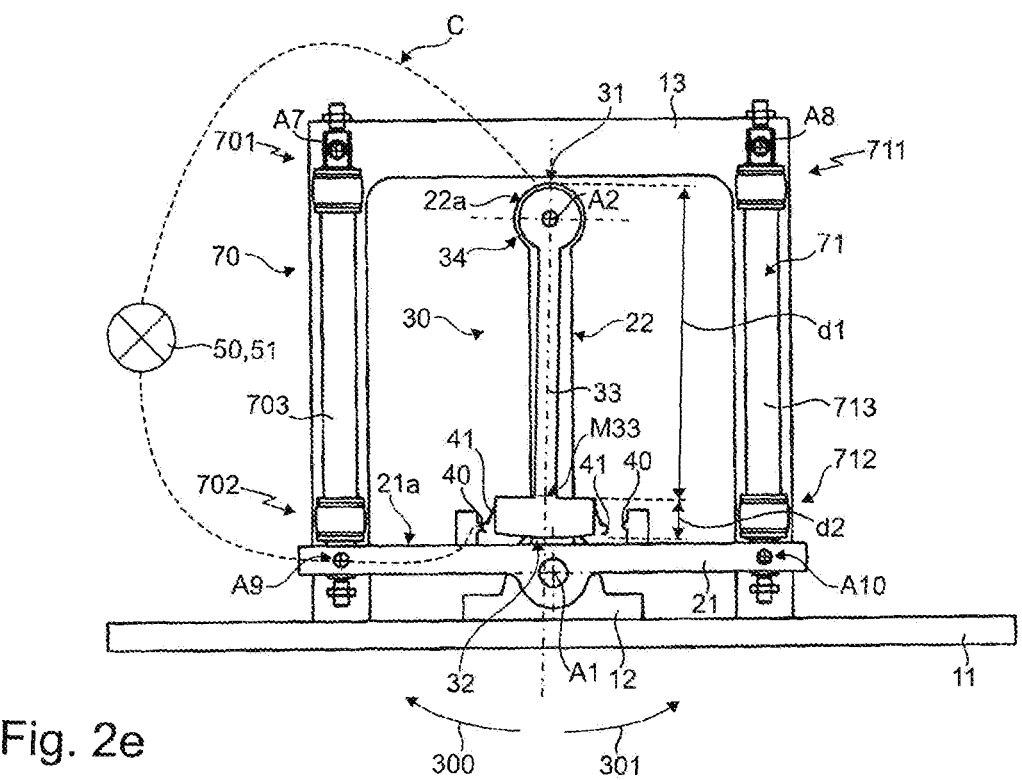
FIG. 2e shows an enlarged view of a detail of FIG. 2c.

According to FIGS. 2c and 2e, it can be seen that the coordinate systems of the vehicle V, the first assembly 10 and the second assembly 20 are still offset at least in relation to their height direction Vz, 20z and their width direction Vy, 20y by the angle β from the global coordinate system. On the other hand, however, it can be seen that the pendulum arrangement 30 has already been arranged parallel to the global height direction Z with respect to its height axis 30z due to the effect of gravity on the pendulum arrangement 30. The pendulum arrangement 30 is thus deflected relative to the second assembly 20; alternatively, this could of course also be formulated in such a way that the second assembly 20 is deflected relative to the pendulum arrangement 30. One of the first contact elements 40 and one of the second contact elements 41 thus form contact with one another. This closes a circuit C, whereby a consumer 50 designed as an actuator system 51 is activated within the circuit C (see FIG. 2e).

The actuator system 51 now actively guides the second assembly 20 back to its initial position P20. As described, this returned state is shown in a simplified manner according to FIG. 1 and again with reference to FIG. 2d. Thus, while the pendulum arrangement 30 and the second assembly 20 are already in the initial position P20, P30, FIG. 2d shows that the coordinate systems of the vehicle V and the first assembly 10 are still offset at least in relation to their height direction Vz and their width direction Vy by the angle β from the global coordinate system.

Figure 3A:
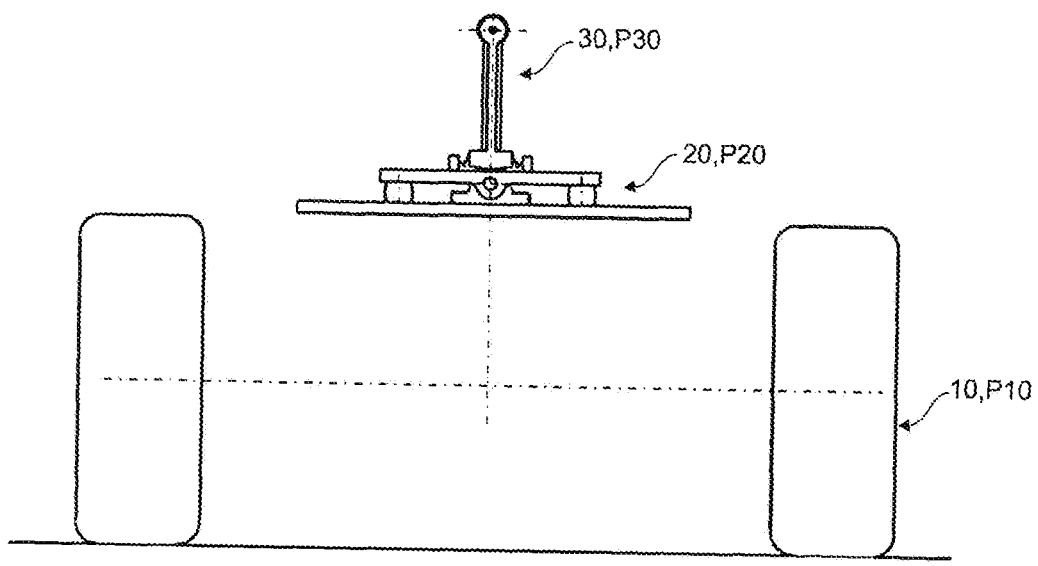
FIG. 3a is a schematic view of a system according to the invention according to a second preferred variant in an initial position.
Figure 3B:
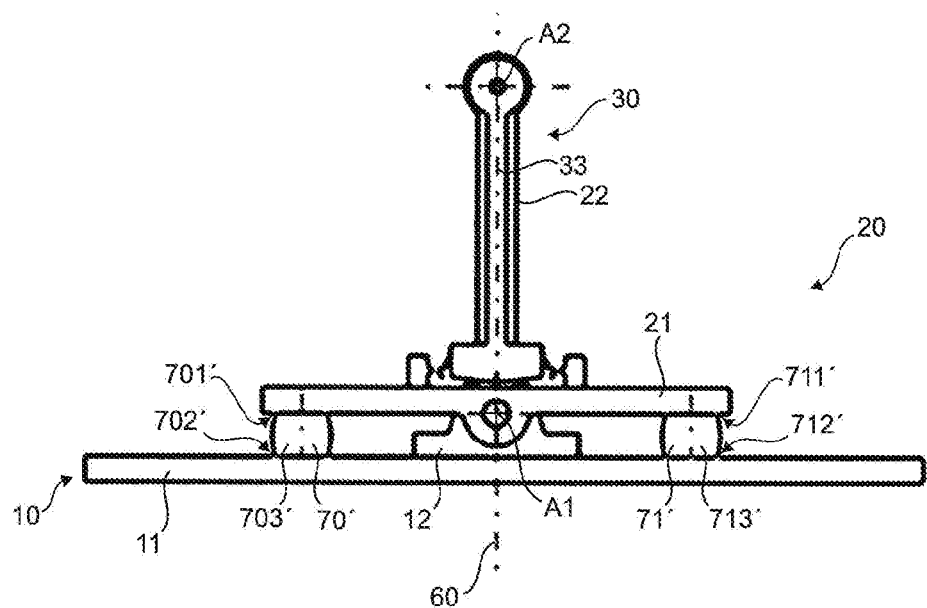

In particular, according to FIG. 3b, it is shown that in the present case the first axis A1 and the second axis A2 lie on a common straight line 60, which is arranged in a height direction Vz of the vehicle V. In the present case, the height direction Vz of the vehicle V corresponds to the global height direction Z at least when the vehicle V is not deflected.

FIG. 2e shows that in the present case the first assembly 10 comprises a supporting bar element 11, the longitudinal extension of which is arranged parallel to the global width direction Y in the first initial position P10. In the present case, the first assembly 10 comprises a bearing element 12 for the first axis A1, which is rigidly connected to an upper side of the supporting bar element 11. In the present case, the supporting bar element 11 and the bearing element 12 together form an assembly which has exactly one axis of mirror symmetry, which in the present case is formed by the common straight line 60.

In order to provide a system S which is not sensitive to relatively small deflections and is thus designed to ignore them, the pendulum arrangement 30 in the present case comprises a pendulum element 33 which can be deflected about the second axis A2 by means of a pivot bearing 34 providing damping (see in particular FIG. 2e).

Furthermore, in the present case, a distance d2 between a centre of mass M33 of the pendulum element 33 and a lower end 32 of the pendulum arrangement 30 is smaller than a distance d1 between the centre of mass M33 of the pendulum element 33 and the upper end 31 of the pendulum arrangement 30.

In addition, the pendulum element 33 is configured in a T-shape and in the shape of a hammer, which is arranged upside down at least in the third initial position P30 of the pendulum arrangement 30 (see FIG. 2a).

It is ensured in the present case that the system S according to the invention does not require any sensors, actuators or control for detection of the deflection. Only a single degree of deflection in a first direction 300 and a single degree of deflection in a second direction 301 can be detected by means of the system S shown.

It is also shown that in the present case the second assembly 20 comprises two first contact elements 40 for closing a circuit C. Furthermore, it is shown that the pendulum arrangement 30 has at its lower end 32 two second contact elements 41 for closing the circuit C. In the present case, the first contact element 40 and both second contact elements 41 are spaced apart from one another in the third initial position P30 (see FIG. 2a) and can be arranged in contact with one another by means of the deflection of the pendulum arrangement 30 relative to the second assembly 20 (see FIG. 2e). The circuit C is therefore at least not closed when the second initial position P20 and the third initial position P30 are present together.

According to the illustration in FIG. 2e, one of the first contact elements 40 and one of the second contact elements 41 form a closed circuit C in the contacting state, i.e. both are traversed by the charge carriers of the circuit C.

So that a closed circuit C can be formed, in the present case power cables (not shown) are arranged within the system S, which are arranged starting from the first contact element 40 via the pendulum arrangement 30 to the second contact element 41.

Furthermore, it is shown that the second assembly 20 in the present case has a rocker element 21 which is rotatably mounted about the first axis A1 and on the upper side 21a of which the two first contact elements 40 are arranged.

It is also shown that the second assembly 20 in the present case has a first bar element 22 which is arranged perpendicular to the rocker element 21 and is rigidly connected thereto, wherein the pivot bearing 34 for the pendulum element 33 is arranged at an upper end 22a of the first bar element 22. In the present case, the first bar element 22 and the rocker element 21 together form a T shape, which is arranged upside down in relation to the height direction 20z of the second assembly 20.

In the present case, in the first P10 and second initial position P20 (see FIG. 2a), the rocker element 21 and the bar element 22 are each configured to be mirror-symmetrical to the common straight line 60. In the present case, in the first P10 and second initial position P20, the two first contact elements 40 are arranged mirror-symmetrically to one another with respect to the common straight line 60. In the present case, in the first P10 and second initial position P20, the two second contact elements 41 are arranged mirror-symmetrically to one another with respect to the common straight line 60.

In the present case, the pendulum element 33 and the pendulum assembly 30 are configured to be mirror-symmetrical. In the third initial position P30 of the pendulum element 33, the axis of mirror symmetry is the common straight line 60.

In the present case, the closing of the circuit C thus serves as indirect detection of the deflection of the pendulum element 33 with respect to the second assembly 20. At the same time, it is shown that a consumer element 50 is arranged within the circuit C.

In the present case, the consumer element 50 is configured as an actuator system 51, by means of which the deflection of the pendulum arrangement 30 can be returned relative to the second assembly 20.

According to a first embodiment or a first preferred variant of the system S (see FIGS. 2a to 2e), the actuator system 51 comprises two air muscles 70, 71, each having a first end 701, 711 and a second end 702, 712 and an air reservoir 703, 713 arranged between the first end 701, 711 and the second end 702, 712. The quantity of air in the air reservoir 703, 713 of the air muscle 70, 71 can be changed, wherein the first end 701, 711 of the air muscle 70, 71 is rotatably connected to the first assembly 10 and the second end 702, 712 of the air muscle 70, 71 is rotatably connected to the second assembly 20.

In the present case, the two air muscles 70, 71 in the first P10 and second initial position P20 are arranged next to one another in the global width direction Y and extend parallel to the global height direction Z with regard to their expansion between the first end 701, 711 and the second end 702, 712. In addition, a first air quantity in the first air reservoir 703 of the first air muscle 70 can be controlled independently of a second air quantity in the second air reservoir 713 of the second air muscle 71; the same applies vice versa.

In order to avoid repetition, the sequence of steps in deflecting and returning the second assembly 20 is shown only on the basis of the first preferred variant (FIG. 2a-2d). The second, third and fourth preferred variants of the system S are each shown in such a way that the first assembly 10, the second assembly 20 and the pendulum arrangement 30 are each in the initial position P10, P20, P30. It will be appreciated that the four preferred variants of the system S preferably differ only on the basis of the actuator system 51 used.

According to a second preferred variant (see FIGS. 3a and 3b), the actuator system 51 comprises two air springs 70', 71', each with a first end 701', 711' and a second end 702', 712' and an air reservoir 703', 713' arranged between the first end 701, 711 and the second end 702', 712'. The quantity of air in the air reservoir 703', 713' of the air spring 70', 71' can be changed, wherein the first end 701', 711' of the air spring 70', 71' is rotatably connected to the second assembly 20 and the second end 702', 712' of the air spring 70', 71' is rotatably connected to the first assembly 10.

According to the first and the second preferred variants of the system S, the two air springs 70, 71; 70', 71' in the first P10 and second initial position P20 are arranged next to one another in the global width direction Y and extend parallel to the global height direction Z with regard to their expansion between the first end 701, 711; 701', 711' and the second end 702, 712; 702', 712'. In addition, a first air quantity in the first air reservoir 703; 703' of the first air spring 70; 70' can be controlled independently of a second air quantity in the second air reservoir 713; 713' of the second air spring 71; 71'; the same applies vice versa.

According to the first preferred variant, the second end 702, 712 of the air muscles 70, 71 is arranged at the same height of the rocker element 21. The first end 701, 711 of the air muscles 70, 71 is arranged above the rocker element 21 in the present case. In the present case, both air muscles 70, 71 are arranged completely above the supporting bar element 11. According to the first preferred variant, the first assembly 10 comprises a frame element 13, which is rigidly connected to the supporting bar element 11 and is arranged above it. In the present case, the first end 701, 711 of the air muscles 70, 71 is rotatably connected to the frame element 13 via axes A7, A8. In the present case, the second end 702, 712 of the air muscles 70, 71 is rotatably connected to the rocker element 21 via axes A9, A10. The first end 701, 711 of the air muscles 70, 71 is thus in contact with the first assembly 10 and the second end 702, 712 of the air muscles 70, 71 is in contact with the second assembly 20.

According to the second preferred variant, both air springs 70', 71' are arranged directly between the rocker element 21 and the first assembly 10. In the present case, both air springs 70', 71' are arranged completely below the rocker element 21 and completely above the supporting bar element 11. The first 701', 711' and the second end 702', 712' of the air springs 70', 71' are thus arranged between the rocker element 21 and the first assembly 10. In addition, the first end 701', 711' of the air springs 70', 71' is in contact with the second assembly 20 and the second end 702', 712' of the air springs 70', 71' is in contact with the first assembly 10.

Figure 4A:
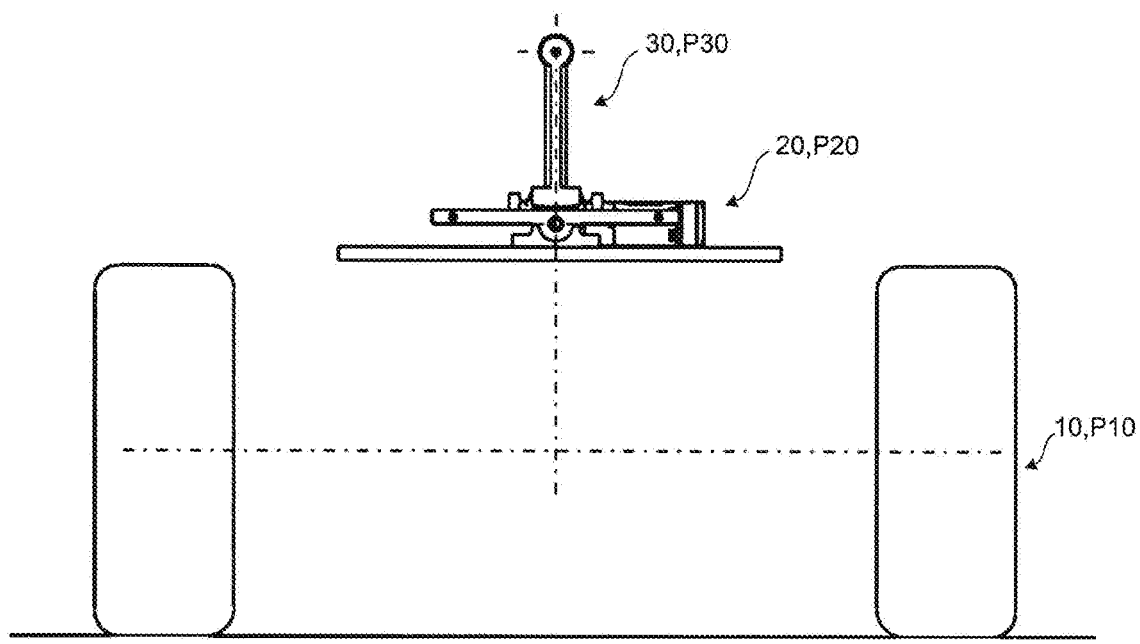
FIG. 4a is a schematic view of a system according to the invention according to a third preferred variant in an initial position.
Figure 4B:
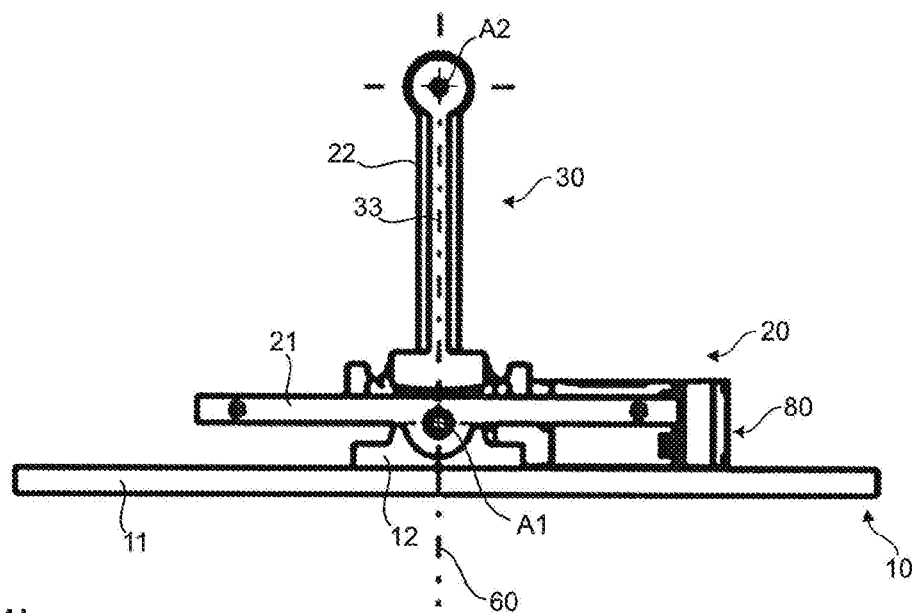

According to a third preferred variant (see FIGS. 4a and 4b), it is shown that the actuator system 51 comprises a first electric drive 80, by means of which the second assembly 20 can be actively rotated about the first axis A1. In the present case, this third variant does not include a suspension/damping device which resiliently supports the entire system. In the present case, this electric drive 80 and its transmission elements are directly connected to the first axis A1; in the present case, the first axis A1 is configured by a shaft element which is rigidly connected to the second assembly 20 and is rotatably arranged with respect to the first assembly 10. In the present case, the electric drive 80 is arranged in contact with the supporting bar element 11 of the first assembly 10, so that the supporting bar element 11 of the first assembly 10 represents a bearing device for the electric drive 80.

Figure 5A:
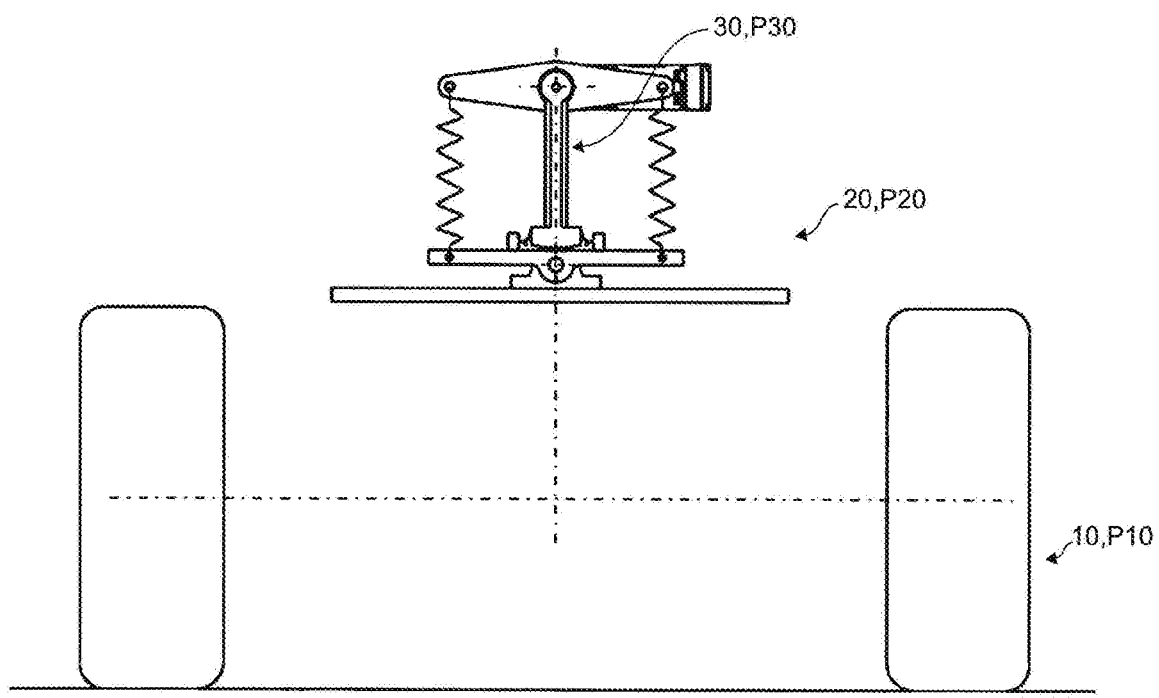
FIG. 5a is a schematic view of a system according to the invention according to a fourth preferred variant in an initial position.
Figure 5B:
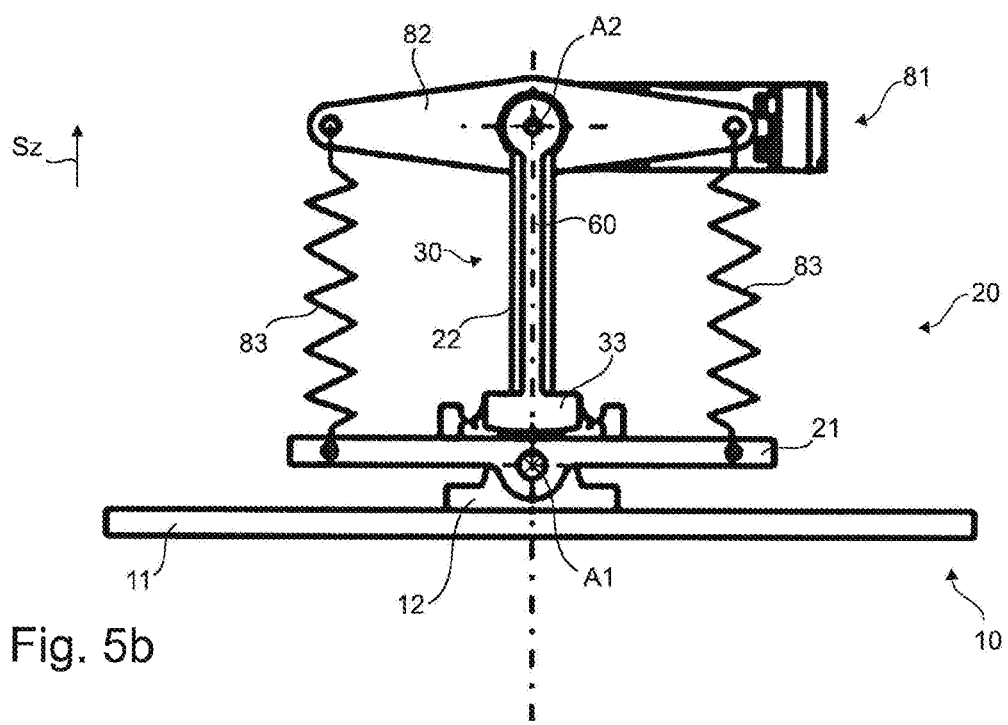

According to a fourth preferred variant (see FIGS. 5a and 5b), it is shown that the actuator system 51 comprises a second electric drive 81, by means of which the second axis A2 or a shaft element which forms the second axis A2 can be actively rotated, wherein a second bar element 82, which is connected at its centre to the second axis A2 and in the present case is pivotable directly about the second axis A2, is connected to the rocker element 21 by means of at least two spring elements 83. In the present case, this second electric drive 81 and its transmission elements are connected directly to the second axis A2. The second assembly 20 is thus cushioned by means of the arrangement described and is returned to its initial position P20.

Figure 6A:
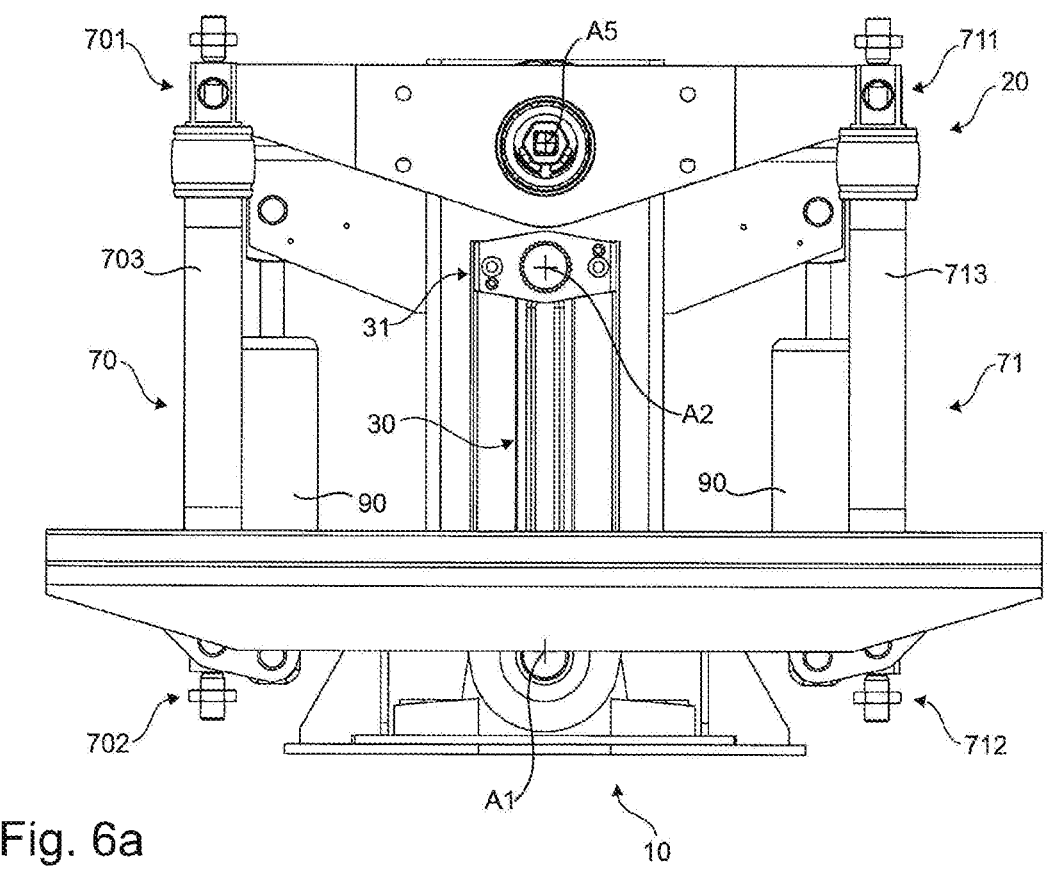
FIG. 6a-6c are different views of the system according to the first preferred variant in the initial position.
Figure 6B:
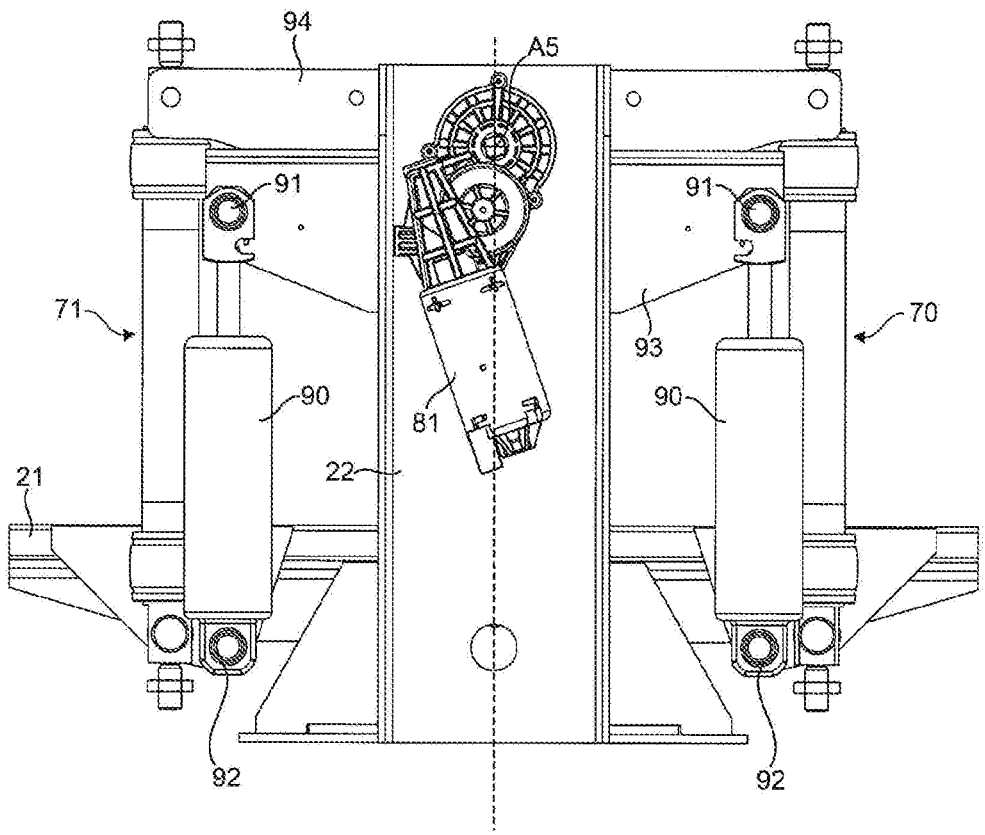
Figure 6C:
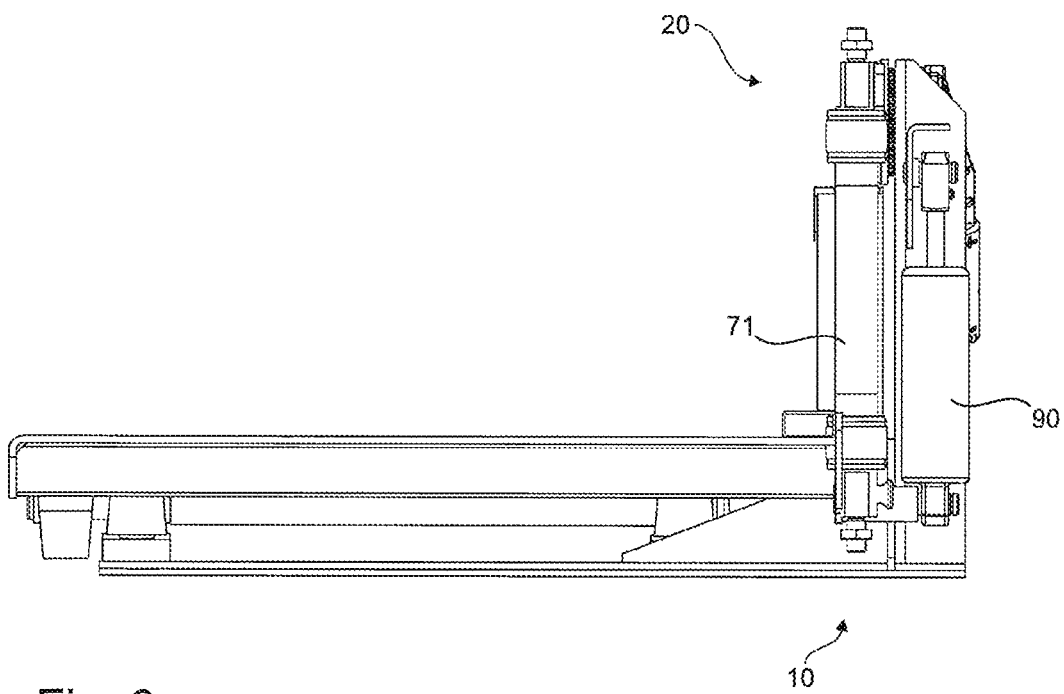

According to FIGS. 6a to 6c, a system S according to the first preferred variant is shown again in more detail. In order to avoid repetition, the system S according to the invention is only partially described below.

FIGS. 6a to 6c each show a part of the first assembly 10 and the second assembly 20, which is shown here without a vehicle seat. Thus, FIG. 6a shows a front view of the system S, FIG. 6b shows a rear view of the system S and FIG. 6c shows a side view of the system S.

Accordingly, the actuator system 51 shown comprises exactly two air muscles 70, 71 having a first end 701, 711 and a second end 702, 712 and an air reservoir 703, 713 arranged between the first end 701, 711 and the second end 702, 712. The quantity of air in the air reservoir 703, 713 can be changed. The first end 701, 711 of the air muscles 70, 71 is arranged above the second end 702, 712 of the air muscles 70, 71. In addition, the first end of the air muscles 70, 71 is rotatably connected to the first assembly 10 and the second end 702, 712 of the air muscles 70, 71 is rotatably connected to the second assembly 20.

FIG. 6a in particular shows that the system S comprises the pendulum arrangement 30, which is pivotally connected to the second assembly 20 by means of the second axis A2 arranged above the first axis A1 and at the upper end 31 of the pendulum arrangement 30.

With reference to FIG. 6a, it is shown that here, too, the actuator system 51 of the system S can comprise an electric drive, for example the second electric drive 81 or another, by means of which the second axis A2 can be actively rotated, wherein a fourth bar element 94, which is connected at its centre to the second axis A2, is connected to the rocker element 21 by means of the two air muscles 70, 71. In the present case, the fourth bar element 94 is arranged to be pivotable about a fifth axis A5, which lies on the common straight line 60. Furthermore, the fifth axis A5 is arranged on the first bar element 22; thus the second bar element 82 is indirectly connected to the second axis A2.

In contrast to the schematic representation of the system according to the first preferred embodiment according to FIGS. 2a to 2e, FIGS. 6a and 6b in particular show that exactly two first damper units 90 are arranged, which are connected by means of a first end 91 to the third bar element 93 of the second assembly 20 and by means of a second end 92 to the rocker element 21 of the second assembly 20.

In the present case, both first damper units 90 are arranged symmetrically to one another with reference to the common straight line 60 of the first A1 and the second axis A2. In the present case, the third bar element 93 is arranged to be pivotable about a third axis A3 arranged on the first bar element 22, wherein the third axis A3 lies on the common straight line 60 of the first A1 and second axis A2.

FIG. 6a shows that the pendulum arrangement 30 comprises a pendulum element 33, which can be deflected about the second axis A2 by means of a pivot bearing 34 which provides damping.

According to FIGS. 7a to 7h and 8a to 8c, a system S according to the fourth preferred variant is shown. In order to avoid repetition, the system S according to the invention is only partially described below.

Figure 7A:
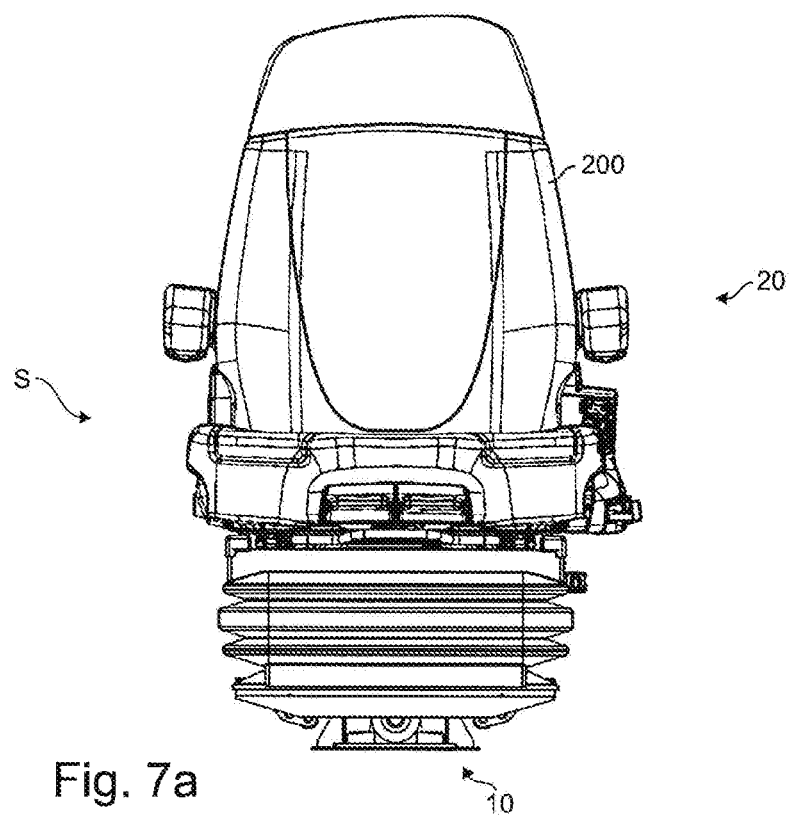
FIG. 7a-7h are different views of the system according to the fourth preferred variant in the initial position.
Figure 7B:
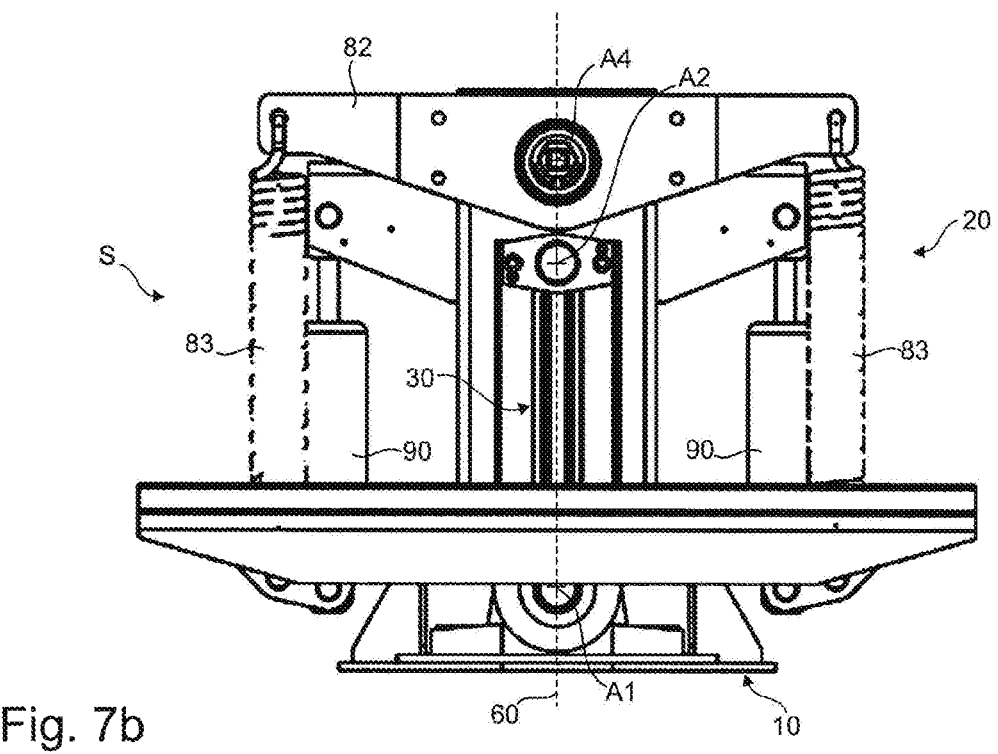
Figure 7C:
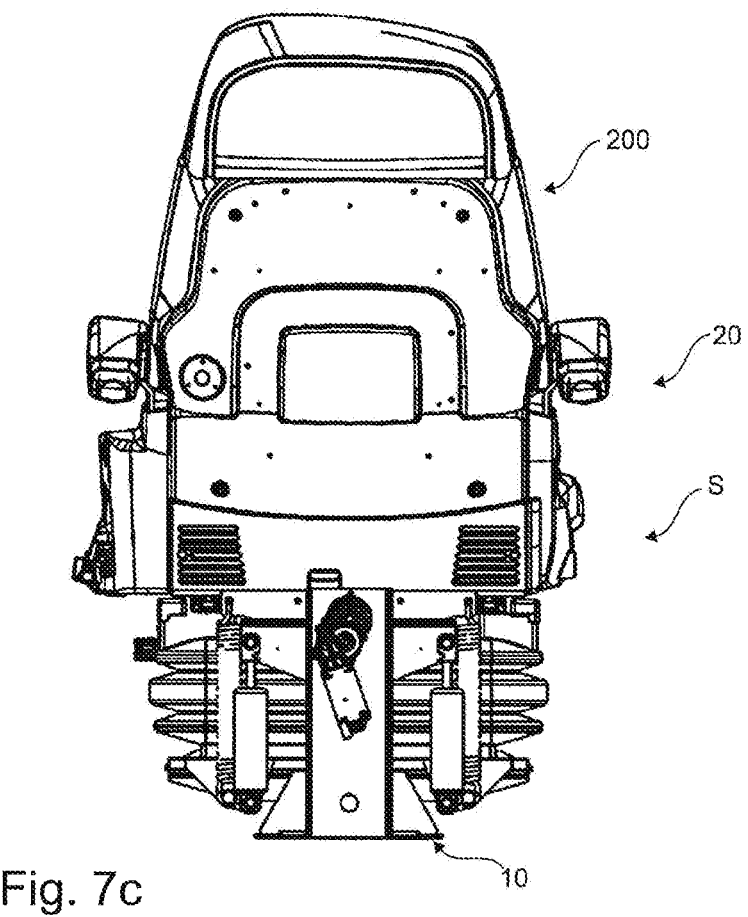
Figure 7D:
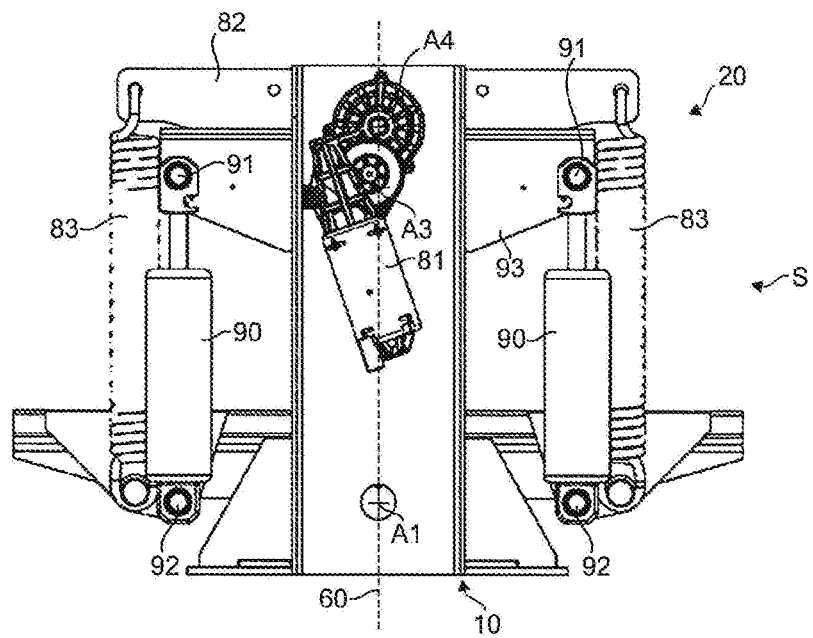
Figure 7E:
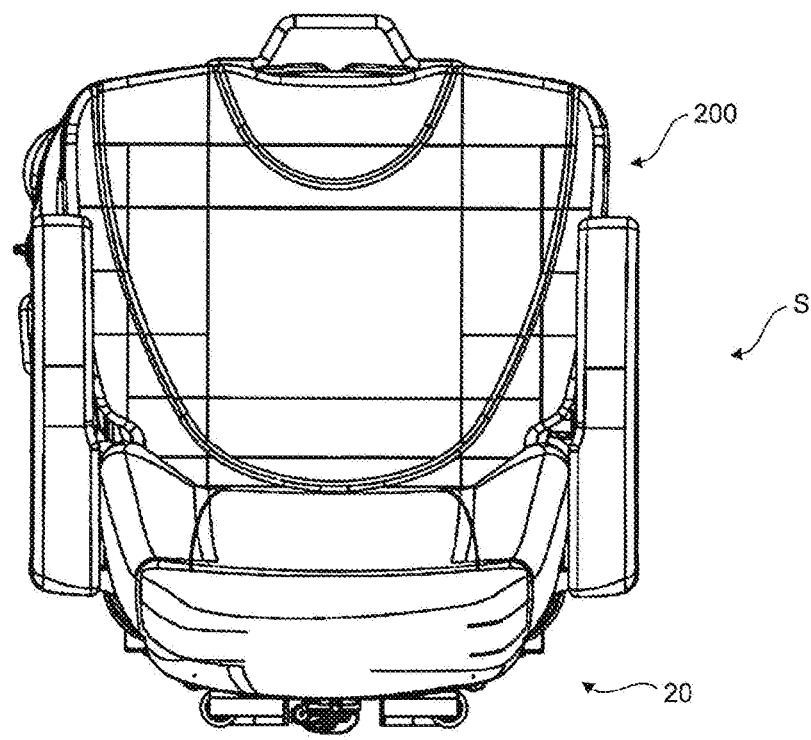
Figure 7F:
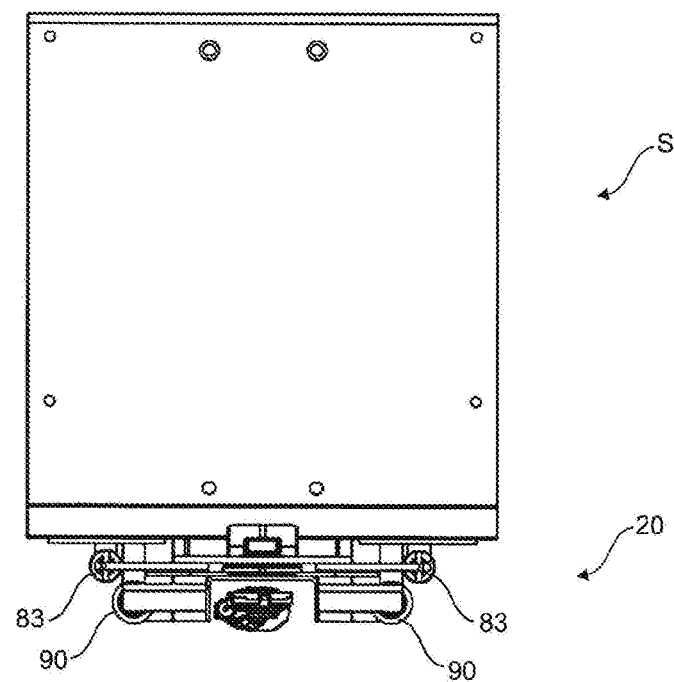
Figure 7G:
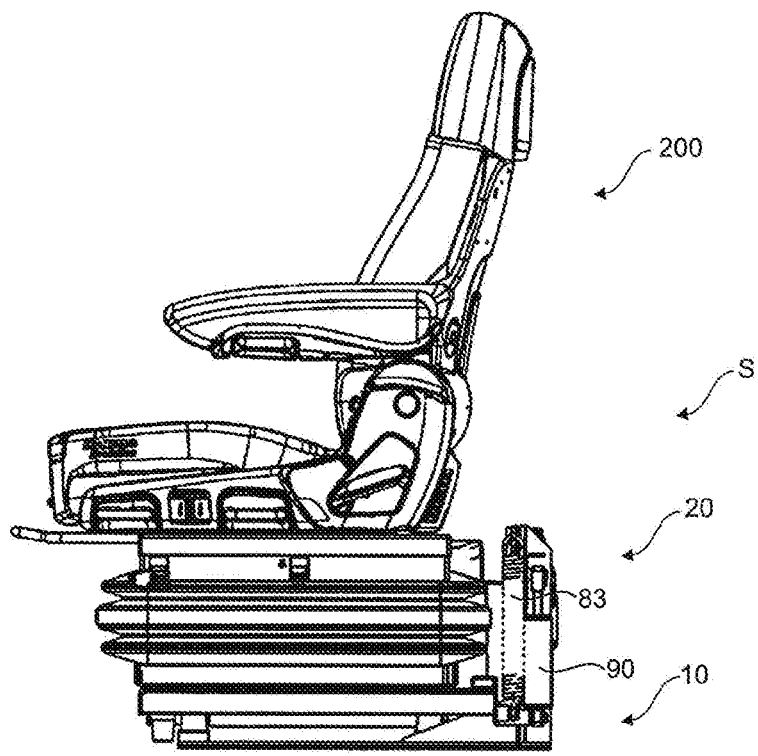
Figure 7H:
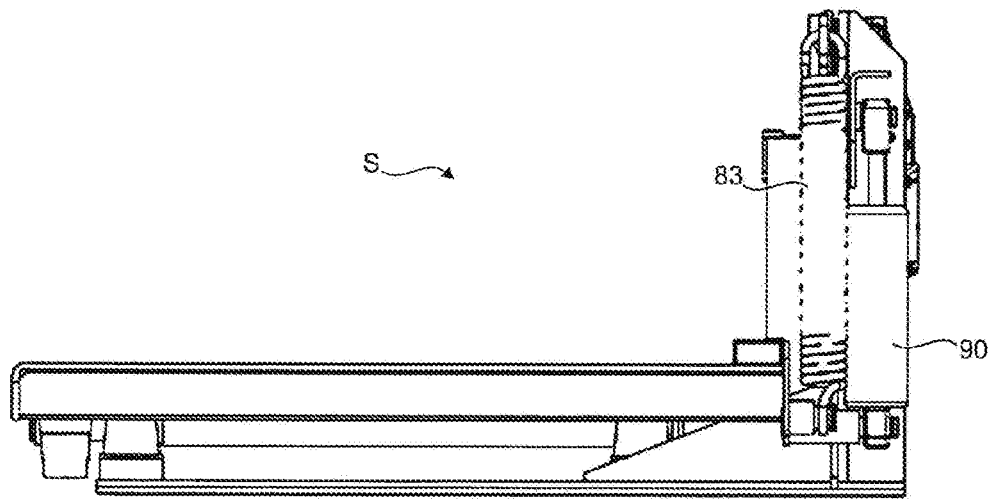

In particular, FIG. 7a shows a part of the first assembly 10 and the second assembly 20, which comprises a vehicle seat 200 of the vehicle V. It should be noted that parts of system S have been omitted in whole or in part in some drawings for the sake of clarity. FIG. 7a shows a view of the system S with a vehicle seat 200, while FIG. 7b shows the same view without a vehicle seat 200. The same applies to FIG. 7c, which shows a rear view of the system S with a vehicle seat 200, while FIG. 7d shows the same view without a vehicle seat 200. FIG. 7e likewise shows a plan view of system S with a vehicle seat 200, while FIG. 7f shows the same view without a vehicle seat 200. Finally, FIG. 7g shows a side view of system S with a vehicle seat 200, while FIG. 7h shows the same view without a vehicle seat 200.

In particular, FIG. 7b shows that the system S comprises the pendulum arrangement 30, which is pivotally connected to the second assembly 20 by means of the second axis A2 arranged above the first axis A1 and at the upper end 31 of the pendulum arrangement 30.

With reference to FIG. 7d, it is shown that the actuator system 51 of the system S comprises a second electric drive 81, by means of which the second axis A2 can be actively rotated, wherein a second bar element 82, which is centred on the second axis A2 is connected to the rocker element 21 by means of at least two spring elements 83. In the present case, the second bar element 82 is pivotally arranged about a fourth axis A4, which lies on the common straight line 60. Furthermore, the fourth axis A4 is arranged on the first bar element 22; thus the second bar element 82 is indirectly connected to the second axis A2.

In contrast to the schematic representation of the system according to the fourth preferred embodiment according to FIGS. 5a and 5b, FIGS. 7b, 7c and 7d in particular show that exactly two first damper units 90 are arranged, which are connected by means of a first end 91 to a third bar element 93 of the second assembly 20 and by means of a second end 92 to the rocker element 21 of the second assembly 20.

In the present case, both first damper units 90 are arranged symmetrically to one another with reference to the common straight line 60 of the first A1 and the second axis A2. In the present case, the third bar element 93 is pivotally arranged about a third axis A3 arranged on the first bar element 22, wherein the third axis A3 lies on the common straight line 60 of the first A1 and second axis A2.

Figure 8A:
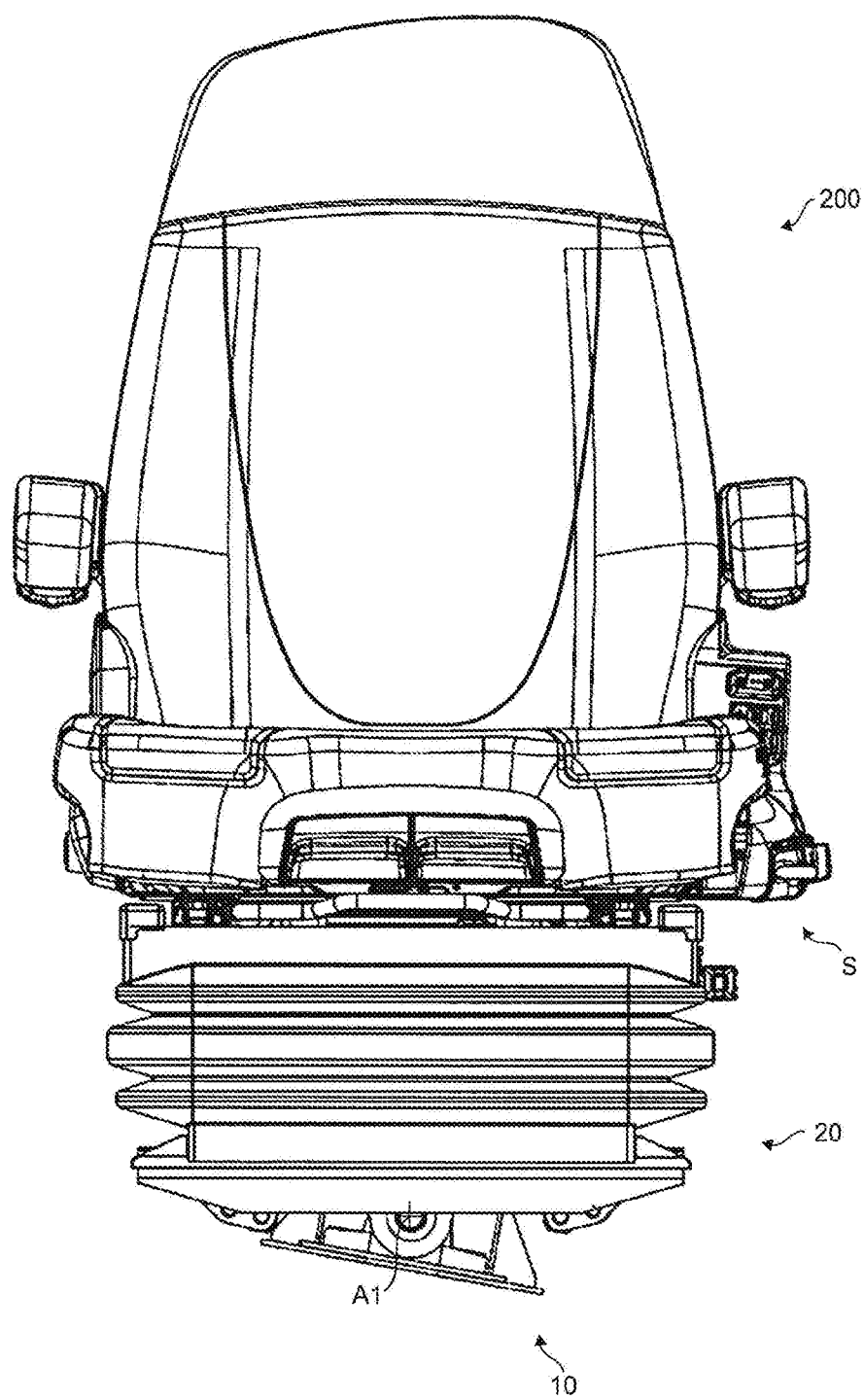
FIG. 8a-8c are different views of the system according to the fourth preferred variant in the deflected state.
Figure 8B:
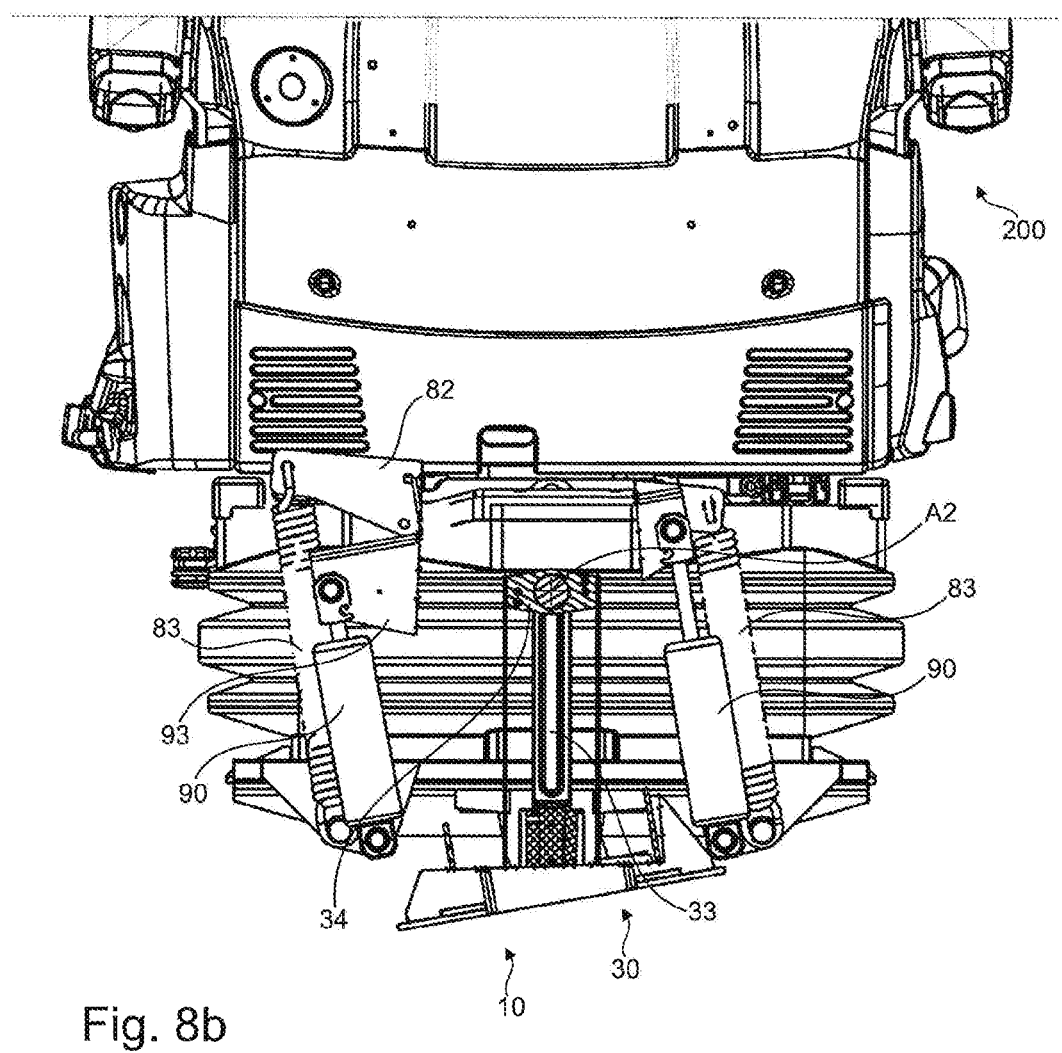
Figure 8C:
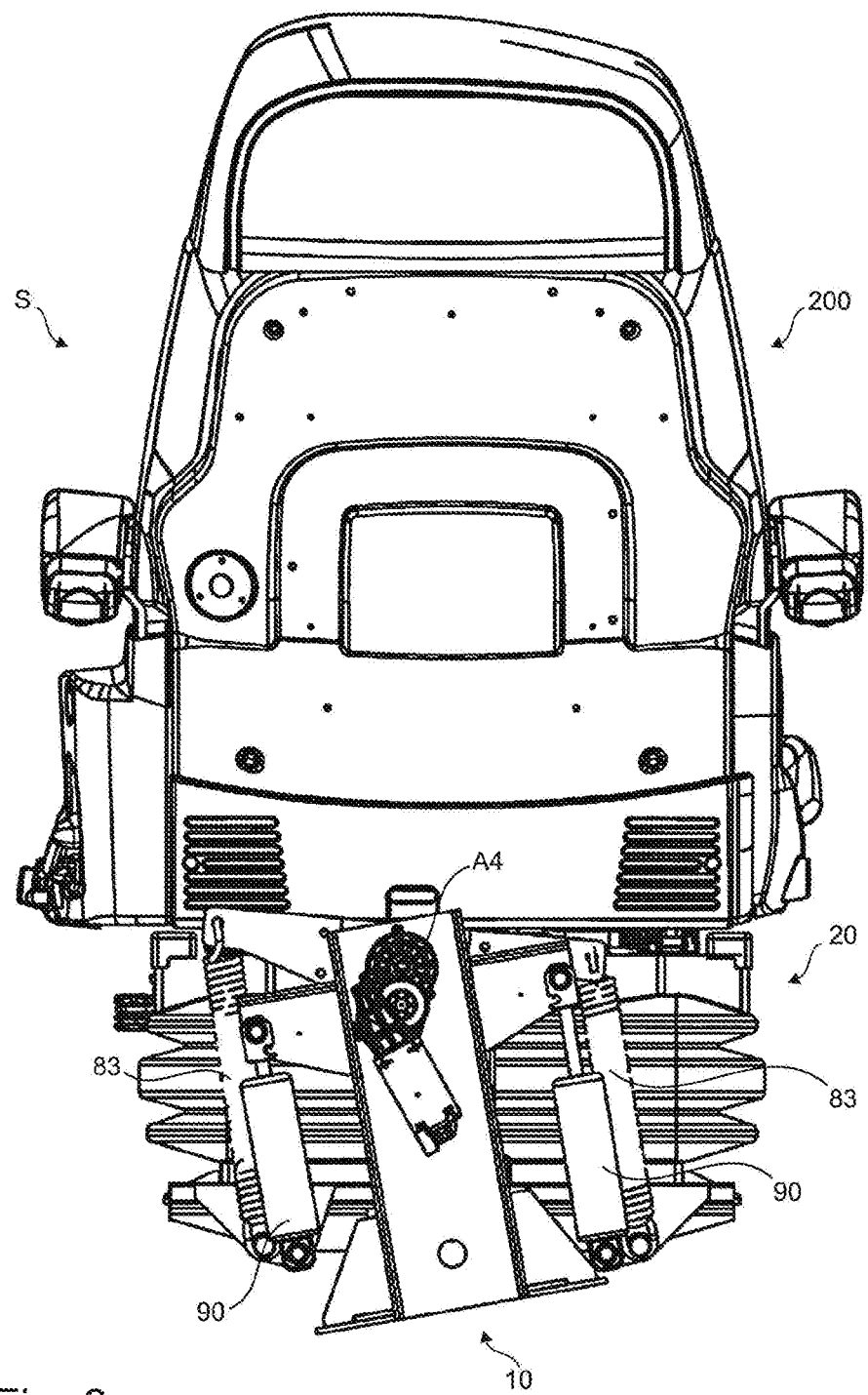

FIG. 8b shows that the pendulum arrangement 30 comprises a pendulum element 33, which can be deflected about the second axis A2 by means of a pivot bearing 34 which provides damping.

FIGS. 9a to 9d now show the pendulum arrangement 30 in detail and various embodiments. Here, too, it is possible that some elements of the pendulum arrangement 30 have been omitted for the sake of clarity.

Figure 9A:
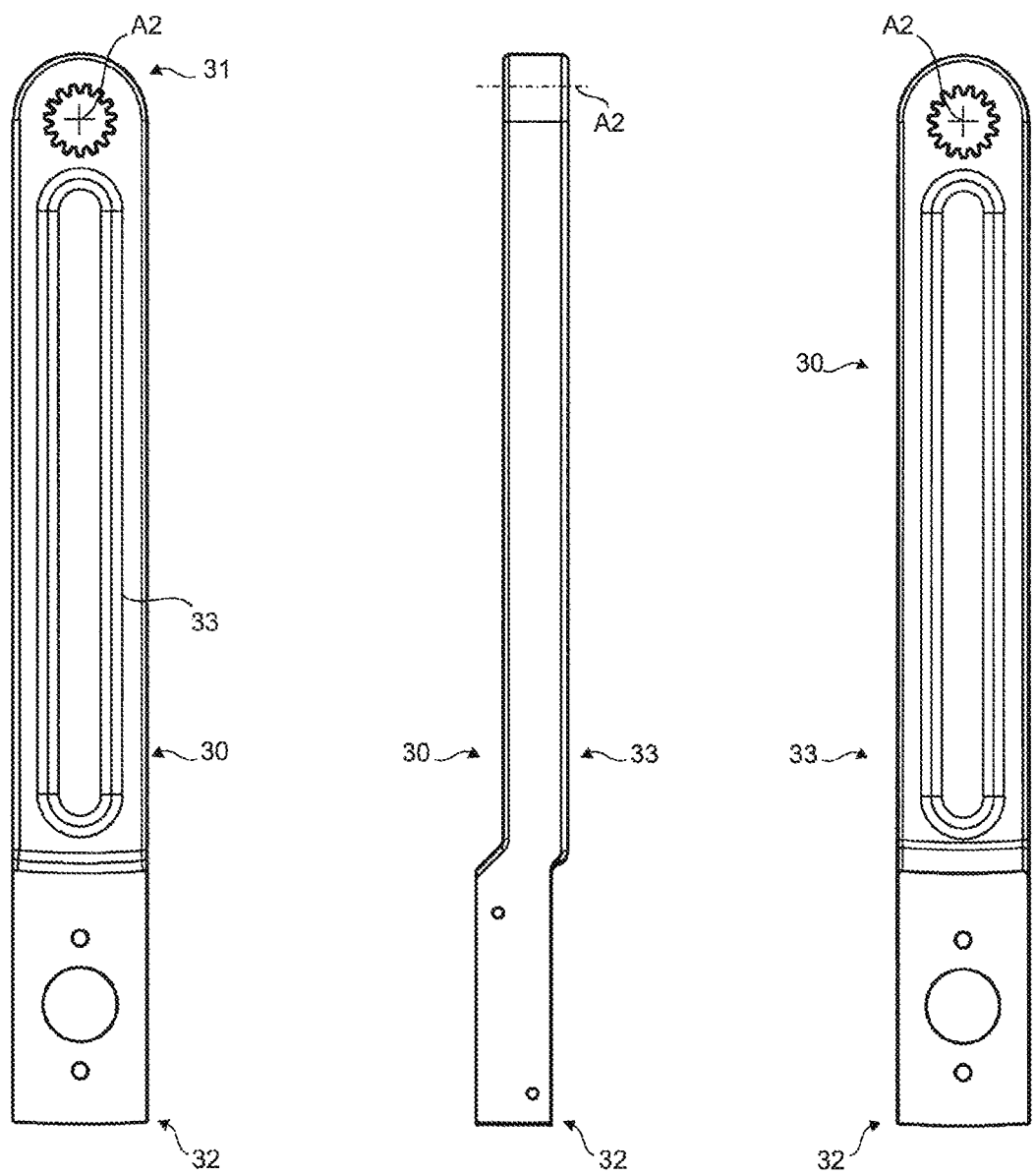
FIG. 9a-9d are different views of preferred embodiments of the pendulum arrangement.

According to FIG. 9a, a front view, a side view and a rear view of a pendulum element 33 of the pendulum arrangement 30 are shown, which pendulum arrangement has an upper 31 and a lower end 32. The position of the second axis A2 is also marked.

Figure 9B:
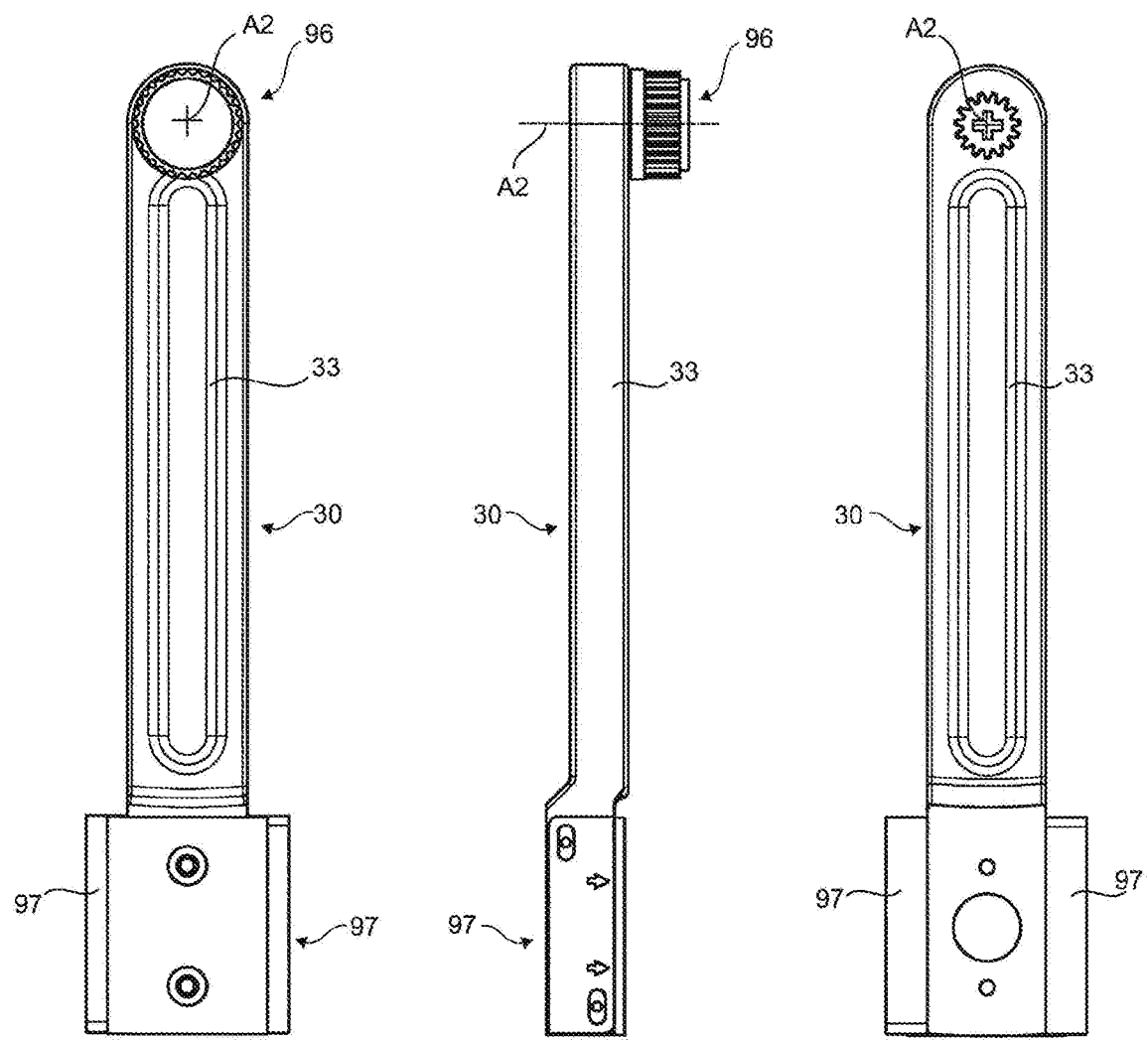

According to FIG. 9b, the pendulum arrangement 30 comprises a brake, in the present case a silicone brake 96, which in the present case is arranged at the upper end 31 of the pendulum arrangement 30. It is also shown that the pendulum arrangement 30 has at a lower end 32 two second contact elements 41 for closing the circuit C, wherein the second contact elements 41 are configured here as magnetic switches 97.

Figure 9C:
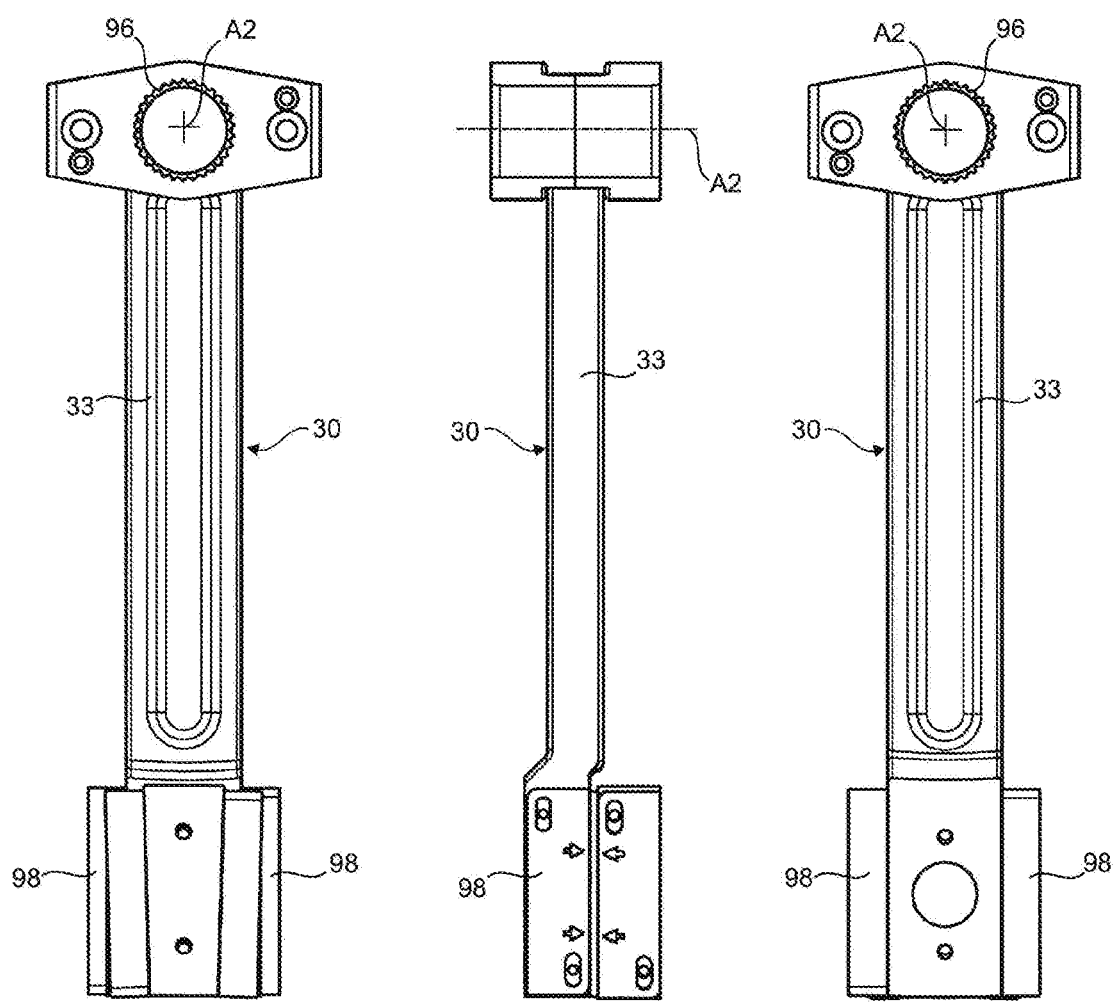

FIG. 9c shows an embodiment similar to FIG. 9b having a silicone brake 96 and a reed switch 98.

Figure 9D:
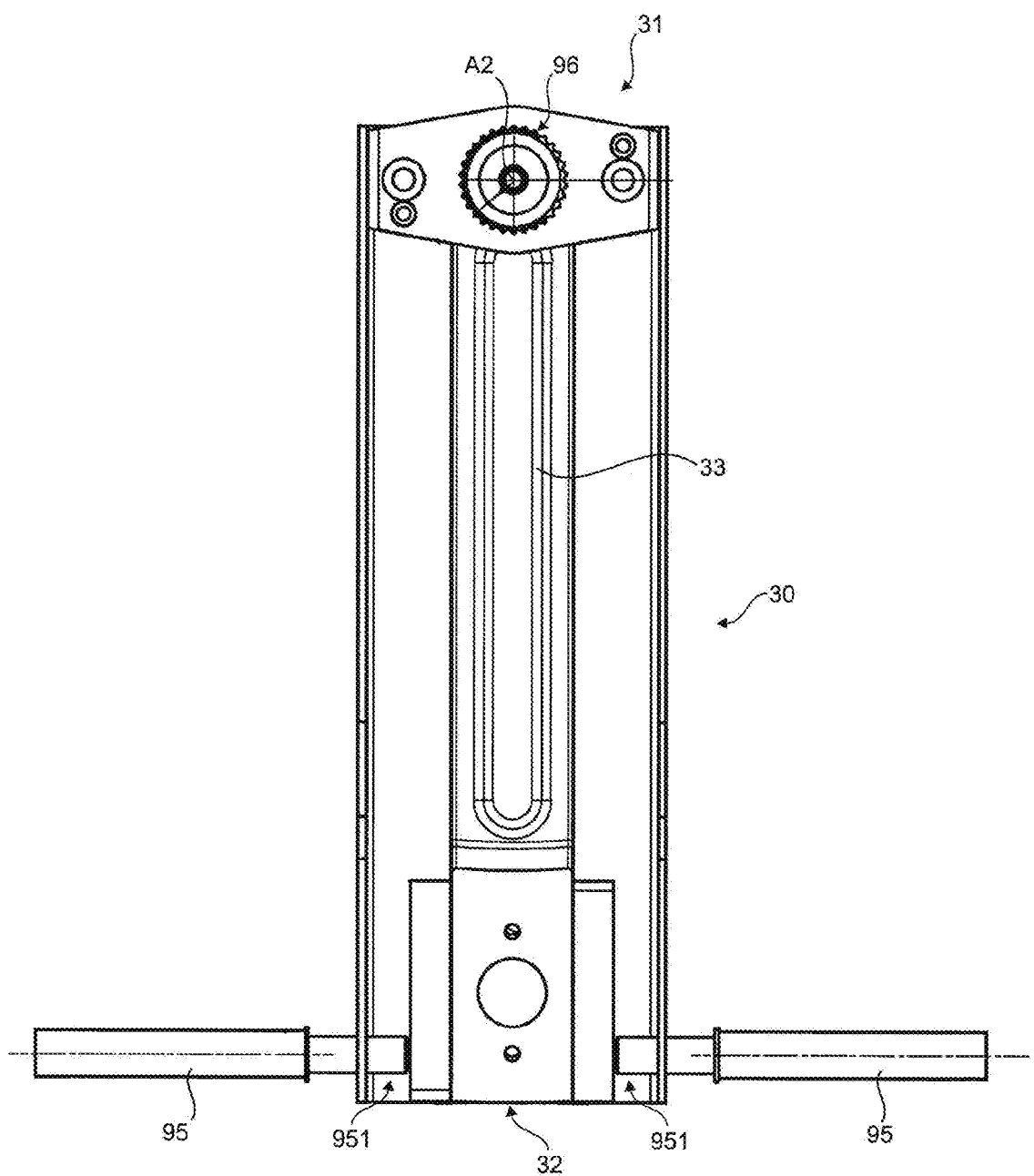

According to FIG. 9d, two second damper units 95 are arranged perpendicular to the common straight line 60 of the first A1 and second axis A2 and perpendicular to the longitudinal direction/longitudinal axis of the pendulum element 33 in its initial position, which second damper units are arranged opposite one other in mirror image in relation to the common straight line 60 and to the longitudinal direction/longitudinal axis of the pendulum element 33. In the present case, the second damper units 95 are shown in a first state, according to which they are arranged with one end 951 each contacting the lower end 32 of the pendulum arrangement 30. According to this particularly preferred embodiment of the pendulum arrangement 30, it is configured without a silicone brake 96 and the two second damper units 95.

It will be appreciated that the above embodiment is merely an initial configuration of the system according to the invention. In this respect, the configuration of the invention is not limited to this embodiment.

All the features disclosed in the application text are claimed as essential to the invention where they are novel with respect to the state of the art individually or in combination.

LIST OF REFERENCE NUMERALS 10, 20 Assembly
11 Supporting bar element
12 Bearing element
13 Frame element
20x, 30x, Vx, X Longitudinal direction
20y, 30y, Vy, Y Width direction
20z, 30z, Vz, Z Height direction
21 Rocker element
22, 82, 93, 94 Bar element
21a Upper side
22a, 31, 32, 91, 92, 951 End
30 Pendulum arrangement
33 Pendulum element
34 Pivot bearing
40, 41 Contact element
50 Consumer element
51 Actuator system
60 Straight line
70, 71 Air muscle
70', 71' Air spring
80, 81 Electric drive
83 Spring element
90, 95 Damper unit
96 Silicone brake
97 Magnetic switch
98 Reed switch
100 Wheel system
200 Vehicle seat
300, 301 Direction
701, 701', 711, 711' First end
702, 702', 712, 712' Second end
703, 703', 713, 713' Air reservoir
A1-A10 Axis
C Circuit
d1, d2 Distance
M33 Centre of mass
P10, P20, P30 Initial position
S System
V Vehicle

The invention claimed is:

1. A system for automatic tilt compensation within a vehicle, the system comprising:
a first assembly;
a second assembly that is pivotally connected to the first assembly by a first axis; and
a pendulum arrangement that is pivotally connected to the second assembly by a second axis arranged above the first axis and at an upper end of the pendulum arrangement,
wherein a deflection of the pendulum arrangement relative to the second assembly can be detected,
wherein the second assembly comprises at least one first contact element for closing a circuit,
wherein the pendulum arrangement has at least one second contact element for closing the circuit at a lower end,
wherein the at least one first and the at least one second contact element are spaced apart from one another in an initial position of the pendulum arrangement and can be arranged in contact with one another by the deflection of the pendulum arrangement relative to the second assembly, and
wherein the second assembly has a rocker element that is rotatably mounted about the first axis and on an upper side of which the at least one first contact element is arranged.

2. The system according to claim 1, wherein the pendulum arrangement comprises a pendulum element which can be deflected about the second axis by a pivot bearing providing damping.

3. The system according to claim 2, wherein a distance between a center of mass of the pendulum element and a lower end of the pendulum arrangement is smaller than a distance between the center of mass of the pendulum element and the upper end of the pendulum arrangement.

4. The system according to claim 1, wherein the second assembly has a first bar element that is arranged perpendicular to the rocker element and is rigidly connected thereto, and wherein a pivot bearing for a pendulum element is arranged at an upper end of the first bar element.

5. The system according to claim 1, wherein at least one consumer element is arranged within the circuit.

6. The system according to claim 5, wherein the consumer element is configured as an actuator system that can reverse the deflection of the pendulum arrangement relative to the second assembly.

7. The system according to claim 6, wherein the actuator system comprises at least one pneumatic element configured as an air muscle or as an air spring having a first end and a second end and an air reservoir arranged between the first end and the second end-,
wherein a quantity of air in the air reservoir of the pneumatic element can be changed,
wherein, when the at least one pneumatic element is configured as the air muscle, the first end of the air muscle is arranged above the second end of the air muscle and is rotatably connected to the first assembly,
wherein, when the at least one pneumatic element is configured as the air muscle, the second end of the air muscle is rotatably connected to the second assembly,
wherein, when the at least one pneumatic element is configured as the air spring, the first end of the air spring is arranged above the second end of the air spring and is rotatably connected to the second assembly, and
wherein, when the at least one pneumatic element is configured as the air spring, the second end of the air spring is rotatably connected to the first assembly.

8. The system according to claim 6, wherein the actuator system comprises at least one first electric drive that can cause the second assembly to actively rotate about the first axis.

9. The system according to claim 8, wherein the actuator system comprises at least one second electric drive, and wherein a first bar element-, which is connected at a center to the second axis, is connected to the rocker element by at least two spring elements.

10. The system according to claim 1, wherein the first assembly comprises a wheel system of the vehicle and the second assembly comprises a vehicle seat of the vehicle.

11. A system for automatic tilt compensation within a vehicle, the system comprising:
a first assembly;
a second assembly that is pivotally connected to the first assembly by a first axis; and
a pendulum arrangement that is pivotally connected to the second assembly by a second axis arranged above the first axis and at an upper end of the pendulum arrangement,
wherein a deflection of the pendulum arrangement relative to the second assembly can be detected, and
wherein the pendulum arrangement comprises a pendulum element that can be deflected about the second axis by a pivot bearing that provides damping.

12. The system according to claim 11, wherein a distance between a center of mass of the pendulum element and a lower end of the pendulum arrangement is smaller than a distance between the center of mass of the pendulum element and the upper end of the pendulum arrangement.

13. The system according to claim 11, wherein the second assembly comprises at least one first contact element for closing a circuit, wherein the pendulum arrangement has at least one second contact element for closing the circuit at a lower end, and wherein the at least one first and the at least one second contact element are spaced apart from one another in an initial position of the pendulum arrangement and can be arranged in contact with one another by the deflection of the pendulum arrangement relative to the second assembly.

14. The system according to claim 13, wherein the second assembly has a rocker element that is rotatably mounted about the first axis and on an upper side of which the at least one first contact element is arranged.

15. The system according to claim 14, wherein the second assembly has a first bar element that is arranged perpendicular to the rocker element and is rigidly connected thereto, and wherein the pivot bearing for the pendulum element is arranged at an upper end of the first bar element.

16. The system according to claim 11, wherein at least one consumer element is arranged within a circuit, and wherein the consumer element is configured as an actuator system that can reverse the deflection of the pendulum arrangement relative to the second assembly.

17. The system according to claim 16, wherein the actuator system comprises at least one pneumatic element configured as an air muscle or as an air spring having a first end and a second end and an air reservoir arranged between the first end and the second end,
wherein a quantity of air in the air reservoir of the pneumatic element can be changed,
wherein, when the at least one pneumatic element is configured as the air muscle, the first end of the air muscle is arranged above the second end of the air muscle and is rotatably connected to the first assembly,
wherein, when the at least one pneumatic element is configured as the air muscle, the second end of the air muscle is rotatably connected to the second assembly,
wherein, when the at least one pneumatic element is configured as the air spring, the first end of the air spring is arranged above the second end of the air spring and is rotatably connected to the second assembly, and
wherein, when the at least one pneumatic element is configured as the air spring, the second end of the air spring is rotatably connected to the first assembly.

18. The system according to claim 16, wherein the actuator system comprises at least one first electric drive that can cause the second assembly to actively rotate about the first axis.

19. The system according to claim 18, wherein the actuator system comprises at least one second electric drive, and wherein a first bar element, which is connected at a center to the second axis, is connected to a rocker element by at least two spring elements.

20. The system according to claim 11, wherein the first assembly comprises a wheel system of the vehicle and the second assembly comprises a vehicle seat of the vehicle.

* * * * *